(12) United States Patent
Lukierski et al.

(10) Patent No.: US 11,276,191 B2
(45) Date of Patent: Mar. 15, 2022

(54) ESTIMATING DIMENSIONS FOR AN ENCLOSED SPACE USING A MULTI-DIRECTIONAL CAMERA

(71) Applicant: Imperial College of Science, Technology and Medicine, London (GB)

(72) Inventors: Robert Lukierski, London (GB); Stefan Leutenegger, London (GB); Andrew Davison, London (GB)

(73) Assignee: IMPERIAL COLLEGE INNOVATIONS LIMITED, London (GB)

(*) Notice: Subject to any disclaimer, the term of this patent is extended or adjusted under 35 U.S.C. 154(b) by 693 days.

(21) Appl. No.: 16/252,426

(22) Filed: Jan. 18, 2019

(65) Prior Publication Data
US 2019/0155302 A1    May 23, 2019

Related U.S. Application Data

(63) Continuation of application No. PCT/GB2017/052037, filed on Jul. 12, 2017.

(30) Foreign Application Priority Data

Jul. 22, 2016  (GB) ...................... 1612767

(51) Int. Cl.
*G01C 22/00* (2006.01)
*G06T 7/55* (2017.01)
(Continued)

(52) U.S. Cl.
CPC ............. *G06T 7/55* (2017.01); *G05D 1/0044* (2013.01); *G05D 1/0251* (2013.01); *G06T 7/521* (2017.01);
(Continued)

(58) Field of Classification Search
CPC .. G06T 7/55; G06T 7/62; G06T 7/521; G06T 7/73; G06T 15/06; G06T 17/00; G05D 1/0044; G05D 1/0251
See application file for complete search history.

(56) References Cited

U.S. PATENT DOCUMENTS 9,233,470 B1 *   1/2016  Bradski ................. B25J 9/1671
2010/0040279 A1  2/2010  Yoon et al.
(Continued)

FOREIGN PATENT DOCUMENTS

| EP | 2829842 A1 | 1/2015 |
| EP | 2854104 A1 | 4/2015 |
| JP | 2014220804 A | 11/2014 |

OTHER PUBLICATIONS

UKIPO Search Report dated Jan. 24, 2017 for Application No. GB1612767.2.
(Continued)

*Primary Examiner* — Adam M Alharbi
(74) *Attorney, Agent, or Firm* — EIP US LLP

(57) ABSTRACT

Certain examples described herein relate to estimating dimensions of an enclosed space such as a room using a monocular multi-directional camera device. In examples, a movement of the camera device around a point in a plane of movement is performed, such as by a robotic device. Using the monocular multi-directional camera device, a sequence of images are obtained at a plurality of different angular positions during the movement. Pose data is determined from the sequence of images. The pose data is determined using a set of features detected within the sequence of images. Depth values are then estimated by evaluating a volumetric function of the sequence of images and the pose data. A three dimensional volume is defined around a reference position of the camera device, wherein the three-dimensional volume has a two-dimensional polygonal cross-
(Continued)

section within the plane of movement. The three dimensional volume is then fitted to the depth values to determine dimensions for the polygonal cross-section. These dimensions then provide an estimate for the shape of the enclosed space.

22 Claims, 10 Drawing Sheets

(51) Int. Cl.
  *G06T 17/00*    (2006.01)
  *G06T 7/62*    (2017.01)
  *G06T 7/521*    (2017.01)
  *G06T 7/73*    (2017.01)
  *G05D 1/00*    (2006.01)
  *G05D 1/02*    (2020.01)
  *G06T 15/06*    (2011.01)

(52) U.S. Cl.
  CPC ............... *G06T 7/62* (2017.01); *G06T 7/73* (2017.01); *G06T 15/06* (2013.01); *G06T 17/00* (2013.01)

(56) References Cited

U.S. PATENT DOCUMENTS

| | | | |
|---|---|---|---|
| 2013/0216098 | A1 | 8/2013 | Hasagawa et al. |
| 2014/0037136 | A1 | 2/2014 | Ramalingam et al. |
| 2014/0184749 | A1* | 7/2014 | Hilliges ............... G01S 17/894 348/47 |
| 2014/0333615 | A1 | 11/2014 | Ramalingam et al. |
| 2014/0350839 | A1 | 11/2014 | Pack et al. |
| 2019/0035099 | A1* | 1/2019 | Ebrahimi Afrouzi ....................... G06T 7/0002 |

OTHER PUBLICATIONS

International Search Report and Written Opinion dated Sep. 25, 2017 for PCT Application No. PCT/GB2017/052037.
Robert Lukierski et al.: "Rapid Free-Space Mapping From a Single Omnidirectional Camera", 2015 European Conference on Mobile Robots, Sep. 2015, pp. 1-8.
Zhaoyin Jia et al.: "3D Based Reasoning with Blocks, Support, and Stability", 2013 IEEE Conference on Computer Vision and Pattern Recognition, Jun. 2013, pp. 1-8.
Hao Jiang et al.: "A Linear Approach to Matching Cuboids in RGBD Images", 2013 IEEE Conference on Computer VIsion and Pattern Recognition, Jun. 2013, pp. 2171-2178.
Thanh Nguyen et al.: "Structural Modeling from Depth Images", IEEE Transactions on Visualization and Computer Graphics, vol. 21, No. 11, Nov. 15, 2015, pp. 1230-1240.
Robert Lukierski et al.: "Room Layout Estimation from Rapid Omnidirectional Exploration", 2017 IEEE International Conference on Robotics and Automation (ICRA), May 2017, pp. 6315-6322.
E. Rosten and T. Drummond, "Machine Learning for High-Speed Corner Detection" in Proceedings of the European Conference on Computer Vision (ECCV), 2006.
D. G. Lowe, "Distinctive image features from scale invariant keypoints", in the International Journal of Computer Vision (IJCV), 60(2):91-110, 2004.
Bill Triggs et al., "Bundle adjustment—a modern synthesis", Vision algorithms: theory and practice, Springer Berlin Heidelberg, 2000, 298-372.
R. A. Newcombe, S. Lovegrove, and A. J. Davison, "DTAM: Dense Tracking and Mapping in Real-Time", in the Proceeings of the International Conference on Computer Vision (ICCV), 2011.
Yukitoshi Kashiwamoto, et al., "YAMATO: Wearable Indoor Floor Map Generation System", 21st multimedia and distributed processing workshop, DPS Workshop 2013 (21st DPSWS collected papers), Japan, Information Processing Society of Japan, Nov. 27, 2013, vol. 2013, No. 6, pp. 20 to 26.
Japanese Office Action dated Jul. 12, 2021 for Japanese Application No. 2019-503262.

* cited by examiner

ESTIMATING DIMENSIONS FOR AN ENCLOSED SPACE USING A MULTI-DIRECTIONAL CAMERA

CROSS-REFERENCE TO RELATED APPLICATIONS

This application is a continuation of International Application No. PCT/GB2017/052037, filed Jul. 12, 2017, which claims priority to UK Application No. GB1612767.2, filed Jul. 22, 2016, under 35 U.S.C. § 119(a). Each of the above-referenced patent applications is incorporated by reference in its entirety.

BACKGROUND OF THE INVENTION

Field of the Invention

The present invention relates to mapping a space using a multi-directional camera. The invention has particular, but not exclusive, relevance to estimating a set of dimensions for an enclosed space based on image data captured from within the space using a monocular multi-directional camera.

Description of the Related Technology

Low cost robotic devices, such as floor cleaning robots, generally rely on limited perception and simple algorithms to map, and in certain cases navigate, a three-dimensional space, such as an interior room. For example, in one case a robotic device may comprise an infra-red or ultrasonic sensor that detects objects within a line of site that may then be avoided. While great progress has been made around techniques such as simultaneous localization and mapping (SLAM), many of the solutions rely on the substantial computational resources that are available to research laboratories. This makes it difficult to translate these solutions to the embedded computing devices that control real-world commercial robotic devices. Additionally, certain solutions require a suite of specialized sensor devices such as LAser Detection And Ranging—LADAR—sensors, structured light sensors, or time-of-flight depth cameras. These specialized sensor devices add expense and complexity that makes them less suitable for real-world robotic applications.

US2010/0040279A1 describes a method and apparatus to build a three-dimensional grid map to control an automatic traveling apparatus. In building the three-dimensional map to discern a current location and a peripheral environment of an unmanned vehicle or a mobile robot, two-dimensional localization and three-dimensional image restoration are used to accurately build the three-dimensional grid map more rapidly. However, this solution requires the use of a stereo omni-directional camera comprising at least two individual omni-directional camera devices and corresponding stereo image processing. This may not be practical or cost-effective for many domestic or low-cost robotic devices.

US2014/0037136A1 describes a method and system for determining poses of vehicle-mounted cameras for in-road obstacle detection. Poses of a movable camera relative to an environment are obtained by determining point correspondences from a set of initial images and then applying two-point motion estimation to the point correspondences to determine a set of initial poses of the camera. A point cloud is generated from the set of initial poses and the point correspondences. Then, for each next image, the point correspondences and corresponding poses are determined, while updating the point cloud. The point cloud may be used to detect obstacles in the environment of a motor vehicle. However, the techniques described therein are more appropriate for larger devices such as cars and other motor vehicles that have access to engine-driven power supplies and that can employ larger, higher-specification computing resources. This may not be practical or cost-effective for many domestic or low-cost robotic devices.

US2013/0216098A1 describes a technique for constructing a map of a crowded three-dimensional space, e.g. environments with lots of people. It includes a successive image acquisition unit that obtains images that are taken while a robot is moving, a local feature quantity extraction unit that extracts a quantity at each feature point from the images, a feature quantity matching unit that performs matching among the quantities in the input images, where quantities are extracted by the extraction unit, an invariant feature quantity calculation unit that calculates an average of the matched quantities among a predetermined number of images by the matching unit as an invariant feature quantity, a distance information acquisition unit that calculates distance information corresponding to each invariant feature quantity based on a position of the robot at times when the images are obtained, and a map generation unit that generates a local metrical map as a hybrid map. While this technique has advantages when used in crowded spaces, it is less appropriate for employment in embedded computing devices with limited computing resources.

EP2854104A1 describes a method for semi-dense simultaneous localization and mapping. In this method, a pose of an image acquisition means and depth information is estimated. Steps of tracking a position and/or orientation of the image acquisition means and mapping by determining depth information are interleaved. The depth information is determined for only a subset of the image pixels, for instance for those pixels for which the intensity variation is sufficiently high.

While the aforementioned techniques have certain advantages for particular situations, they are often complex and require intensive computation. This makes these techniques difficult to implement on an embedded controller of, for example, a small low-cost domestic robotic device. As such there is a desire for control techniques that move beyond the limited perception and simple algorithms of available robotic devices while still being practical and general enough for application on those same devices.

SUMMARY

According to one aspect of the present invention there is provided an image processing method for estimating dimensions of an enclosed space comprising: obtaining image data from a monocular multi-directional camera device located within the enclosed space, the monocular multi-directional camera device being arranged to capture image data from a plurality of angular positions, the image data comprising a sequence of images having disparity within a plane of movement of the camera device; determining pose data corresponding to the image data, the pose data indicating the location and orientation of the monocular multi-directional camera device, the pose data being determined using a set of features detected within the image data; estimating depth values by evaluating a volumetric function of the image data and the pose data, each depth value representing a distance from a reference position of the monocular multi-directional camera device to a surface in the enclosed space; defining a three-dimensional volume around the reference position of the monocular multi-directional camera device, the three-dimensional volume having a two-dimensional polygonal cross-section within the plane of movement of the camera device; and fitting the three-dimensional volume to the depth values to determine dimensions for the polygonal cross-section, wherein the determined dimensions provide an estimate for the dimensions of the enclosed space.

In one case, fitting the three-dimensional volume to the depth values comprises: optimizing, with regard to the dimensions for the polygonal cross-section, a function of an error between: a first set of depth values from the evaluation of the volumetric function of the image data and the pose data, and a second set of depth values estimated from the reference position to the walls of the three-dimensional volume. Ray tracing may be used to determine the second set of depth values. The function of the error may be evaluated by comparing a depth image with pixel values defining the first set of depth values with a depth image with pixel values defining second set of depth values. The function may comprise an asymmetric function, wherein the asymmetric function returns higher values when the first set of depth values are greater than the second set of depth values as compared to when the first set of depth values are less than the second set of depth values.

In one case, the method comprises applying automatic differentiation with forward accumulation to compute Jacobians, wherein said Jacobians are used to optimize the function of the error between the first and second sets of depth values.

In certain examples, the polygonal cross-section comprises a rectangle and said dimensions comprise distances from the reference position to respective sides of the rectangle. In this case, fitting the three-dimensional volume may comprise determining an angle of rotation of the rectangle with respect to the reference position. Also the three-dimensional volume may be fitted using a coordinate descent approach that evaluates the distances from the reference position to respective sides of the rectangle before the angle of rotation of the rectangle with respect to the reference position.

In certain cases, the method is repeated for multiple spaced movements of the monocular multi-directional camera device to determine dimensions for a plurality of rectangles, the rectangles representing an extent of the enclosed space. In these cases, the method may comprise determining an overlap of the rectangles; and using the overlap to determine room demarcation within the enclosed space, wherein, if the overlap is below a predefined threshold, the plurality of rectangles are determined to be associated with a respective plurality of rooms within the space, and wherein, if the overlap is above a predefined threshold, the plurality of rectangles are determined to be associated with a complex shape of the enclosed space. The latter operation may comprise computing a Boolean union of the plurality of rectangles to provide an estimate for a shape of the enclosed space.

In one example, the method may comprise inputting the dimensions for the polygonal cross-section into a room classifier; and determining a room class using the room classifier. An activity pattern for a robotic device may be determined based on the room class.

According to a second aspect of the present invention, there is provided a system for estimating dimensions of an enclosed space comprising: a monocular multi-directional camera device to capture a sequence of images from a plurality of angular positions within the enclosed space; a pose estimator to determine pose data from the sequence of images, the pose data indicating the location and orientation of the monocular multi-directional camera device at a plurality of positions during the instructed movement, the pose data being determined using a set of features detected within the sequence of images; a depth estimator to estimate depth values by evaluating a volumetric function of the sequence of images and the pose data, each depth value representing a distance from a reference position of the multi-directional camera device to a surface in the enclosed space; and a dimension estimator to: fit a three-dimensional volume to the depth values from the depth estimator by optimizing dimensions of a two-dimensional polygonal cross-section of the three-dimensional volume, and output an estimate for the dimensions of the enclosed space based on the optimized dimensions of the two-dimensional polygonal cross-section.

In one case, at least one of the monocular multi-directional camera device, the depth estimator, the pose estimator and the dimension estimator are embedded within a robotic device.

In one case, the system also comprises a room database comprising estimates from the dimension estimator for a plurality of enclosed spaces within a building. The room database may be accessible from a mobile computing device over a network.

The system of the second aspect may be configured to implement any features of the first aspect of the present invention.

According to a third aspect of the present invention there is provided a non-transitory computer-readable storage medium comprising computer-executable instructions which, when executed by a processor, cause a computing device to map a space, wherein the instructions cause the computing device to: receive a sequence of frames from a monocular multi-directional camera, the multi-directional camera being arranged to capture image data for each of the frames from a plurality of angular positions, the sequence of frames being captured at different angular positions within a plane of movement for the space; determine location and orientation estimates for the camera for each frame by matching detected features across the sequence of frames; bundle adjust the location and orientation estimates for the camera and the detected features across the sequence of frames to generate an optimized set of location and orientation estimates for the camera; determine a reference frame from the sequence of frames, the reference frame having an associated reference location and orientation; evaluate a photometric error function between pixel values for the reference frame and projected pixel values from a set of comparison images that overlap the reference frame, said projected pixel values being a function of a surface distance from the camera and the optimized set of location and orientation estimates for the camera; determine a first set of surface distances for different angular positions corresponding to different pixel columns of the reference frame based on the evaluated photometric error function; determine parameters for a planar rectangular cross-section of a three-dimensional volume enclosing the reference location by optimizing an error between the first set of surface distances and a second set of surface distances determined based on the three-dimensional volume; and determine a floor plan for the space using the determined parameters for the planar rectangular cross-section.

In one example, the instructions are repeated to determine parameters for a plurality of planar rectangular cross-sections. In one case, the instructions to determine a floor plan comprise instructions to determine a floor plan based on a union of the plurality of planar rectangular cross-sections. In another case, the instructions comprise instructions to: determine a spatial overlap of the plurality of planar rectangular cross-sections; and determine room demarcation for the space based on the spatial overlap.

In other examples, a non-transitory computer-readable storage medium may comprise computer-executable instructions which, when executed by a processor, cause a computing device, such as an embedded computer in a robotic device or a remote processor in a distributed system, to perform any of the methods discussed above.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 1A:
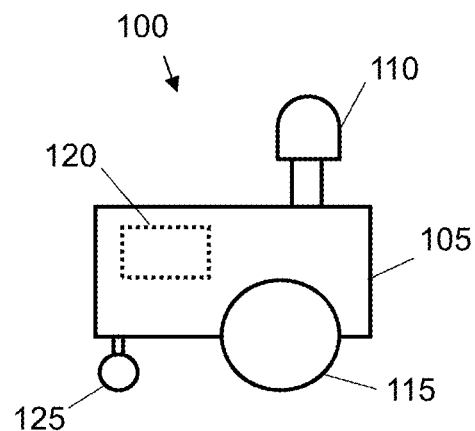
FIGS. 1A and 1B are schematic diagrams showing two examples of robotic devices.

Certain examples described herein estimate a shape of an enclosed space, such as a room within a building, based on image data from a monocular multi-directional camera device. This estimate of a shape of an enclosed space, e.g. in the form of values that define a two-dimensional polygonal cross-section within a plane of navigation for the space, may be used by a robotic device to navigate the space, and/or displayed to a human controller.

Certain examples use a monocular multi-directional camera device to obtain a sequence of images at a plurality of different angular positions within the enclosed space. For floor-based robots that move in an approximate x-y plane of movement, these images may comprise a sequence of closely-spaced images with disparity in all horizontal directions. They may be obtained by performing a number of circular or circumferential movements. These may be small movements in relation to the size of the enclosed space. The camera device may comprise a single omni-directional camera.

Certain examples described herein then provide specific processing operations for these images. This processing is applicable within embedded computing resources, e.g. within a processor of a robotic device or mobile computing device. In one example, pose data is determined from the sequence of images using a feature-based approach. Once this pose data has been calculated for the sequence of images, a volumetric function of the images and the pose data is evaluated to determine depth values, e.g. representing a distance of objects within the space from the camera device. The volumetric function comprises a function that is evaluated within three-dimensions, e.g. in relation to a volume of space. The volumetric function may comprise evaluating a dense omni-directional cost volume that is modelled around a reference image. Evaluating the volumetric function may comprise optimizing this cost volume, e.g. finding parameter values that minimize a cost value. The two-step approach of determining pose data and evaluating a volumetric function combines benefits of both sparse and dense approaches to modelling an environment, while selecting appropriate computations so as to limit the relative disadvantages of both approaches.

In examples described herein, dimensions for a two-dimensional polygonal cross-section within the plane of movement of the camera device, e.g. for a room plan or cross-section as viewed from above, are determined by fitting a three-dimensional volume that is generated from the cross-section to the estimated depth values. The three dimensional volume is determined around a reference position corresponding to the reference image for the volumetric function. The plane of movement may be a plane parallel to a floor (e.g. a plane having a common z-axis value). The dimensions may correspond to an extent of the polygonal cross-section in the x and y directions, e.g. as determined from the reference position. The dimensions may be defined as distances from the reference position of the camera device to sides of the cross-section, wherein these sides may correspond to walls or surfaces within a room. The examples described herein may thus be used to autonomously determine room plans in homes and offices. The examples may be applied in both interior and exterior enclosed spaces (e.g. stadiums, pens, amphitheatres etc.).

Certain examples described herein combine two and three-dimensional computations in a manner that allows for fast evaluation on limited computer resources and/or real-time operation. Certain examples output data that is useable to allow a robotic device to quickly and accurately navigate an enclosed space, e.g. such as within interior rooms, or to measure aspects of the space without human intervention, e.g. for mapping unknown areas.

Certain examples described herein enable room classification and/or demarcation to be applied. For example, the dimensions computed by the method or systems described herein may be evaluated to determine complex room shapes or to determine whether there are multiple rooms within a common space. The dimensions may also be used as input to a room classifier, e.g. on their own or with other collected data, so as to determine a room class, e.g. a string label or selected data definition, for an enclosed space.

Example Robotic Devices

FIG. 1A shows a first example 100 of a test robotic device 105 that may be used to estimate dimensions of an enclosed space as described herein. This test robotic device is provided for ease of understanding the following examples and should not be seen as limiting; other robotic devices of different configurations may equally apply the operations described in the following passages. Although certain methods and systems are described in the context of a space explored by a robotic device, the same methods and systems may alternatively be applied using data obtained from a handheld or other mobile device, e.g. such a device with an inbuilt monocular multi-directional camera device that is moved by a human being or other robotic device.

The test robotic device 105 of FIG. 1A comprises a monocular multi-directional camera device 110 to capture an image from a plurality of angular positions. In use, multiple images may be captured, one after each other. In certain cases, the plurality of angular positions cover a wide field of view. In a particular case, the camera device 110 may comprise an omni-directional camera, e.g. a device arranged to capture a field of view of substantially 360 degrees. In this case, the omni-directional camera may comprise a device with a panoramic-annular-lens, e.g. the lens may be mounted in relation to a charge-coupled array. In the example of FIG. 1A, the camera device 110 is mounted on a configurable arm above the robotic device; in other cases, the camera device 110 may be statically mounted within a body portion of the test robotic device 105. In one case, the monocular multi-directional camera device may comprise a still image device configured to capture a sequence of images; in another case, the monocular multi-directional camera device may comprise a video device to capture video data comprising a sequence of images in the form of video frames. It certain cases, the video device may be configured to capture video data at a frame rate of around, or greater than, 25 or 30 frames per second.

The test robotic device 105 of FIG. 1A further comprises at least one movement actuator 115 that in this case comprises a set of driven wheels arranged in relation to the body portion of the test robotic device 105. The at least one movement actuator 115, which may comprise at least one electric motor coupled to one or more wheels, tracks and/or rollers, is arranged to move the robotic device within a space. An example of such a space is described later with reference to FIGS. 2A and 2B. The test robotic device 105 also comprises a controller 120. This may comprise an embedded computing device as indicated by the dashed lines in FIG. 1A. For example, the controller 120 may be implemented using at least one processor and memory and/or one or more system-on-chip controllers. In certain cases, the controller 120 may be implemented by way of machine-readable instructions, e.g. firmware as retrieved from a read-only or programmable memory such as an erasable programmable read-only memory (EPROM). The controller 120 controls movement of the test robotic device 105 within the space. For example, controller 120 may instruct the at least one movement actuator to propel the test robotic device 105 forwards or backwards, or to differentially drive the wheels of the test robotic device 105 so as to turn or rotate the device. In FIG. 1A, the test robotic device 105 also has a rotatable free-wheel 125 that allows rotation of the test robotic device 105. In operation, the controller 120 may be configured to determine dimensions for an enclosed space. For example, the controller 120 may comprise a memory or other machine-readable medium where data defining the dimensions is stored. In one experimental configuration, a Pioneer 3DX mobile robot platform was used to implement the test robotic device 105.

Figure 1B:
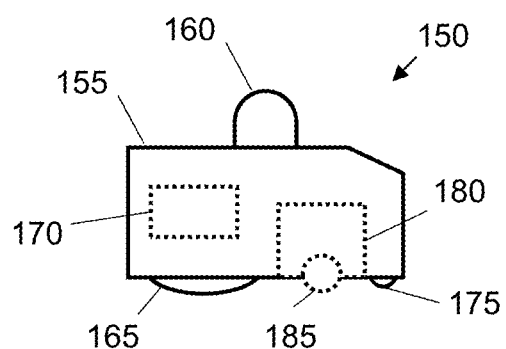

FIG. 1B shows another example 150 of a robotic device 155. The robotic device 155 of FIG. 1B comprises a domestic cleaning robot. Like the test robotic device 105, the cleaning robotic device 155 comprises a monocular multi-directional camera device 160. In the example of FIG. 1B, the camera device 160 is mounted on the top of the cleaning robotic device 155. In one implementation, the cleaning robotic device 155 may have a height of around 10 to 15 cm; however, other sizes are possible. The cleaning robotic device 155 also comprises at least one movement actuator 165; in the present case this comprises at least one electric motor arranged to drive two sets of tracks mounted on either side of the device to propel the device forwards and backwards. These tracks may further be differentially driven to steer the cleaning robotic device 155. In other examples, different drive and/or steering components and technologies may be provided. As in FIG. 1A, the cleaning robotic device 155 comprises a controller 170 and a rotatable free-wheel 175.

In addition to the components of the test robotic device 105 shown in FIG. 1A, the cleaning robotic device comprises a cleaning element 180. This cleaning element 180 may comprise an element to clean a floor of a room. It may comprise rollers or brushes 185 and/or wet or dry elements. In one case, the cleaning element 180 may comprise a vacuum device, e.g. arranged to capture dirt and dust particles. In this case, the controller 170 may be configured to use the dimensions of the enclosed space, either directly or indirectly (e.g. as part of a room classification or demarcation pipeline), to determine a cleaning pattern for the space and instruct activation of the cleaning element 180 according to the cleaning pattern. For example, a vacuum device may be activated to clean an area of space defined by the dimensions. The robotic device may use the dimensions of the space to determine, amongst others, one or more of: required levels of cleaning fluid; required battery power to clean the space (if it is determined that this power is not available an alert may be provided); a cleaning device or system to use for a particular room (e.g. a kitchen may use a wet element that is not suitable for a carpeted room of different dimensions); and a cleaning pattern for the space (e.g. a proposed route to cover the area of the space).

Example Motion for Robotic Device

Figure 2A:
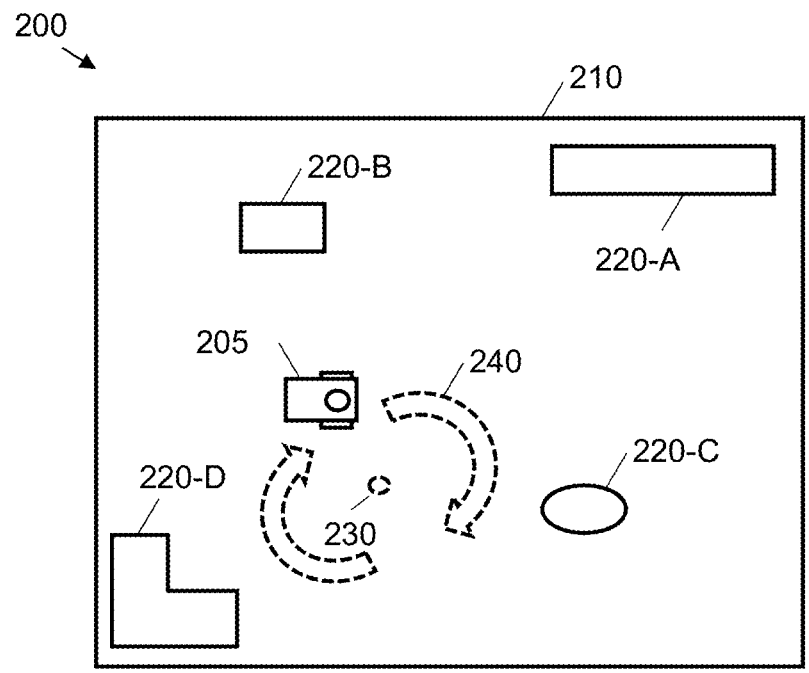
FIGS. 2A and 2B are schematic diagrams showing motion of a robotic device according to examples.
Figure 2B:
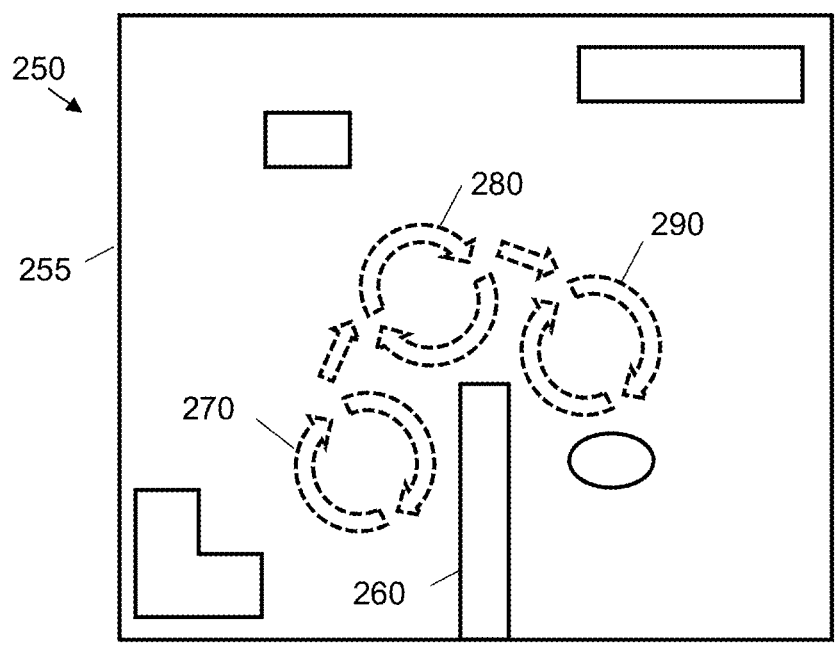

FIGS. 2A and 2B schematically show motion 200, 250 of a robotic device 205 within a space 210 according to two examples. The robotic device 205 may, in some examples, comprise a device as shown in FIGS. 1A and 1B. In FIGS. 2A and 2B the space 210 comprises a three-dimensional space in the form of an interior room. In other examples, the space may be any internal and/or external enclosed physical space, e.g. at least a portion of a room or geographical location that is surrounded by one or more surfaces, where a typical room is surrounded by four surfaces (excluding the floor and ceiling). In certain cases, a space may be enclosed or surrounded by surfaces on two sides, wherein the other sides are estimated by assuming a regular polygonal cross section such as a square or rectangle. The examples described herein may be applied in an exterior space without a ceiling, e.g. without a surface above the robotic device. Similarly, if the robotic device is an aerial device, such as a (multirotor) helicopter, a floor, e.g. a surface under the robotic device, may also not be required to apply the examples described herein.

The space 210 in FIGS. 2A and 2B comprise a number of physical objects 220 that are located with the space. Not all enclosed spaces need include physical objects such as 220; however, many real-world spaces will include such objects. The objects 220 may comprise one or more of, amongst others: furniture, building portions, equipment, raised floor portions, interior wall portions, people, electronic devices, animals, etc. Although the space 210 in FIGS. 2A and 2B is shown from above as being planar with a lower surface this need not be the case in all implementations, for example an environment may be aerial or within extra-terrestrial space. The lower surface of the space also need not be a level floor, e.g. it may comprise an inclined plane and/or multi-level series of planes.

In the example of FIG. 2A, the robotic device 205 is adapted to move around a point 230 in the space. For example, a controller 120 or 170 as shown in FIG. 1A or 1B may be configured to instruct a movement 240 using at least one movement actuator, e.g. 115 or 165. During the movement 240, the robotic device 205 is configured to obtain a sequence of images at a plurality of different angular positions using an equipped monocular multi-directional camera device, e.g. 110 or 160 in FIG. 1A or 1B. For example, the movement 240 may comprise a substantially circular motion within a portion of the space. In certain cases, the movement 240 may comprise a complete loop, e.g. a rotation of 360 degrees around the point 230; in other cases, the movement may comprise a portion of a loop, e.g. a rotation of less than 360 degrees around the point 230. The movement 240 need not be circular, it may be a circumferential movement around at least a portion of a perimeter of any shape, e.g. any polygon including those with equal and unequal sides. In a relatively small-size room of around 4 or 5 metres square (e.g. an average domestic room), the movement 240 may comprise in the order of 0.5 metres across, e.g. may comprise a roughly circular motion with a diameter of 0.5 metres. This may take between 10-20 seconds. In certain test examples, for a small-size room, a sequence of images may comprise on the order of 100 or 200 frames.

In general, in the example of 2A, the robotic device 205 is controlled so as to perform at least one motion to enable the monocular multi-directional camera device to capture at least one sequence of closely-spaced images (e.g. video frames) that have disparity in a plurality of directions. For example, in a space with an approximately horizontal floor, i.e. forming a plane of movement for the robotic device 205, the sequence of closely-spaced images may have disparity in a plurality of horizontal directions. Comparatively, in spaces with an angled plane for movement, or in aerial or extra-terrestrial spaces, the disparity may be in a plurality of directions that are parallel with the plane of movement. This movement 240 may be seen as a brief explanatory movement, e.g. analogous to a (sub-conscious) human or animal ability to glance around a room to orientate themselves within the room. The movement 240 allows a robotic device 205 to quickly obtain a global idea of the shape of the space. This is described in more detail in the sections below. This then provides a robotic device 205 with an ability to rapidly map and as such subsequently "understand" the global space within a room, and facilitates intelligent high-level planning and semantic understanding of spaces.

FIG. 2B shows an example motion 250 that may be used in larger spaces, e.g. exterior spaces and/or multi-segment interior spaces. For example, the space 255 in FIG. 2B may comprise a room with at least one wall of 10-20 metres. In certain examples, as shown in FIG. 2B, the space may comprise a plurality of space portions that are separated by visual barriers, e.g. partition 260 may comprise, amongst others, a partial or full wall, a desk unit or an item of furniture. In FIG. 2B, the motion 250 comprises a plurality of movements 270, 280 and 290, e.g. a plurality of movements as described with respect to FIG. 2A. In FIG. 2B, three movements are shown; however, this is not intended to be limiting. In this case, the movements may comprise a set of similar or dissimilar movements, e.g. selected from a set of circular or circumferential movements around a point or at least a portion of a perimeter of a shape. For larger rooms, the movements may be larger than those described for smaller rooms, e.g. a circular movement may be around 1 metre in diameter. The plurality of movements may be controlled such that visual occlusions, such as partition 260, are at least partially circumnavigated. For example, data obtained from the first movement 270 may be used to detect partition 260 and instruct, e.g. by way of a controller, a second movement 280 that takes place beyond the partition. The number of movements and/or the spacing between different movements may depend on the size of the space and/or the location of objects within the space. In a room with at least one wall of 10-20 metres the spacing may be of the order of 1-3 metres. In certain cases, additional movements may be performed until a predefined portion of space has been mapped. In the example of FIG. 2B, the robotic device 205 is configured to makes several small circular scans in sequence, moving to a new viewpoint in-between, whereby additional parts of the space are revealed since occluding obstacles are being rounded. The information obtained from all of these scans may be used to determine room demarcation and/or to determine dimensions for complex enclosed spaces, as is described in more detail in the following sections.

Example Polygonal Cross-Sections for a Space

Figure 3A:
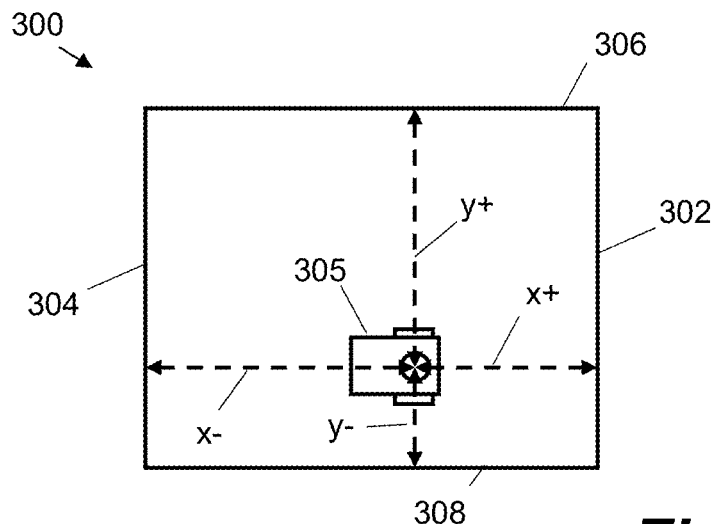
FIG. 3A is a schematic diagram showing dimensions of an example polygonal cross-section.

FIG. 3A shows an example polygonal cross-section 300. This polygonal cross-section may be used to estimate the shape of an enclosed space in the methods described herein. The polygonal cross-section may be based on any polygon. In certain examples, the polygon is a rectangle, i.e. a box. In tests, a rectangular, i.e. box, shape provided robust dimension estimation and versatility. In implementations, the polygonal cross-section may be defined by data representing a set of dimensions, e.g. for a given polygon, side length (and, in certain cases, side angle).

In the example of FIG. 3A, the polygonal cross-section is two-dimensional. The polygonal cross-section may be defined in an x-y plane of the enclosed space (e.g. a plane with a constant z-axis value). This plane may represent a floor plane. FIG. 3A shows robotic device 305 from above, e.g. as moveable within the enclosed space such as along a floor. The robotic device 305 may be one of the robotic devices 105 and 155 having a monocular multi-directional camera device. Reference is made to a robotic device for ease of explanation; in other examples, other entities having a monocular multi-directional camera device may be used.

In FIG. 3A, the polygonal cross-section is defined by dimensions relative to the robotic device 305. These dimensions include four distances: a distance, $x_+$, to a first side 302 of the cross-section 300; a distance, $x_-$, to a second side 304 of the cross-section 300 (that is parallel to the first side 304); a distance, $y_+$, to a third side 306 of the cross-section 300 (that is at 90 degrees to the first side 302); and a distance, $y_-$, to a fourth side 308 of the cross-section 300. Hence, one set of dimensions may comprise $\underline{p}=[x_-, x_+, y_-, y_+]$. From this set, a width may be determined as $x_-+x_+$ and a length may be determined as $y_-+y_+$. Data defining the dimensions of the polygonal cross-section may be stored as vector or array $\underline{p}$ and/or in the form of length and width values.

The position of the robotic device 305 that is used to determine the distances shown in FIG. 3A (i.e. $\underline{p}$) is a reference position of the robotic device 305 as is used to determine a set of depth values in the examples below. The reference position may be determined from a reference pose for a reference image that is used to evaluate the set of depth values, e.g. the reference position may be defined by a location and orientation of the robotic device 305. The reference position and/or reference pose need not relate to an actual position or pose taken by robotic device 305 during the motion described in FIGS. 2A and 2B; it may be a "virtual" position or pose, e.g. from an interpolation of the motion or as computed from pose data. This is described in more detail below.

Figure 3B:
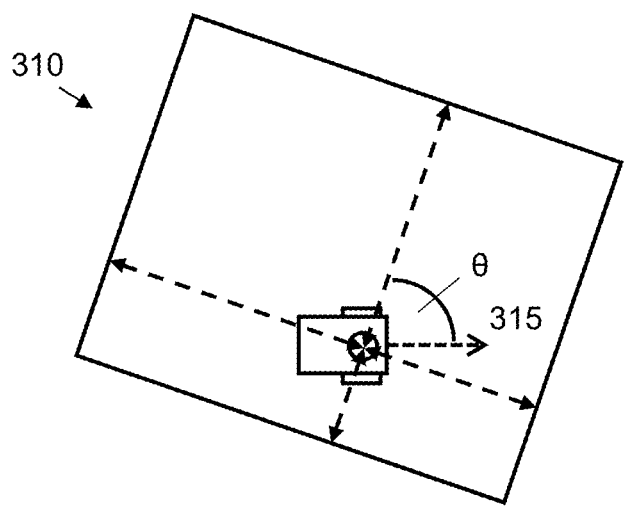
FIG. 3B is a schematic diagram showing an angle of rotation for an example polygonal cross-section.

FIG. 3B shows another variable that may be used, in certain examples, to define the dimensions of a space. FIG. 3B shows an angle, $\theta$, that is defined between the reference pose of the robotic device 305 and the polygonal cross-section 310. This angle may represent an orientation of the polygonal cross-section 310 with respect to a normal direction of the reference pose, as projected onto the two-dimensional plane of the cross-section. Alternatively, the angle may also be defined as the angle that the robotic device 305 makes with the sides of the polygonal cross-section. For example, the reference position of the robotic device 305 may not be parallel with the sides of the cross-section (e.g. as shown in FIG. 3A), i.e. the robotic device 305 may be askew within the space in the reference position. In the example of FIG. 3B, the polygonal cross-section 310 may be parameterized, e.g. defined by the parameters, $\underline{p}=[x_-, x_+, y_-, y_+, \theta]$. As such, the box of FIG. 3B may be said to revolve around the robot device's reference pose with the angle $\theta$ and the four other parameters are distances to surfaces or walls within a room.

Figure 3C:
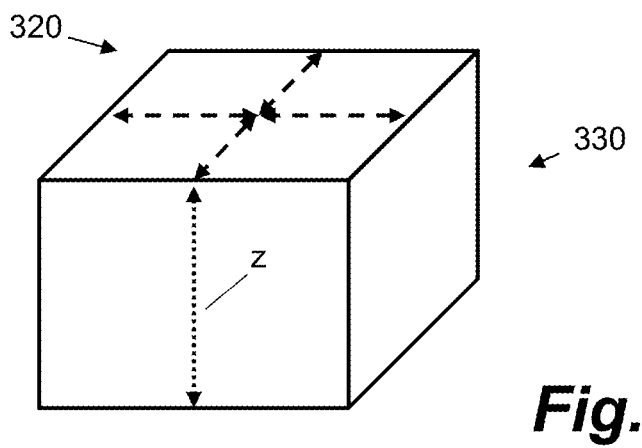
FIG. 3C is a schematic diagram showing an example three-dimensional volume that has a polygonal cross-section.

FIG. 3C shows a three-dimensional volume 330 that is defined around the robotic device 305, i.e. around the reference position discussed above. The three-dimensional volume 330 has a two-dimensional cross-section 320, which may be the cross sections 300 or 310 as described above. The three-dimensional volume 330 is any volume generated by extending (e.g. stretching or extruding) the cross-section 320 in space. For example, if the cross-section comprises an x-y plane, the three-dimensional volume 330 may be defined by extending the cross-section along the z-axis. The height of the three-dimensional volume 330 is not used in the optimization of the dimensions of the cross-section and as such may be set to any arbitrarily large value that ensures full coverage of the viewing angles of the monocular multi-directional camera device. For example, for a typical example interior room, the height of the three-dimensional volume may be set to 5 metres.

In implementations, the three-dimensional volume, as defined by $\underline{p}$ and a predefined height (e.g. 5 m), may be defined using a triangular three-dimensional model, where a box volume may be composed of 8 triangles and 24 vertices (e.g. each side of the volume is defined by 2 triangles). For example, this definition may be used by an Open Graphics Library (OpenGL) implementation. Other graphics engines and/or volume dimensions may be used depending on the nature of the implementation.

The definitions of the two-dimensional cross-sections 300, 310 and the three-dimensional volume 330 illustrated in FIGS. 3A to 3C may be used to determine dimensions of a space as will be described in more detail below.

Processing Pipeline Examples

Following examples of motion as shown in FIGS. 2A and 2B, and following an example cross-section and volume as shown in FIGS. 3A, 3B and 3C, certain examples of a processing operation will now be described. This processing operation is configured to take a sequence of images captured during the motion and generate data defining an estimate for dimensions of an enclosed space, such as computed values for a length and width of a box representing a room plan.

Figure 4A:
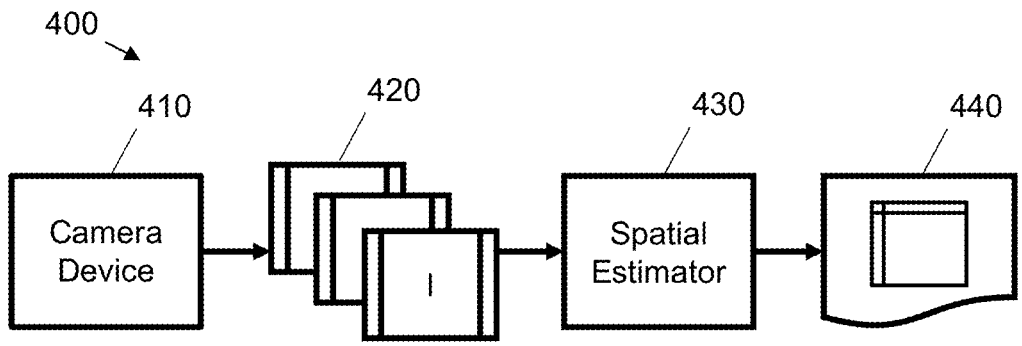
FIGS. 4A and 4B are schematic diagrams showing certain system components for use in estimating dimensions of an enclosed space according to two examples.

FIG. 4A schematically shows certain system components of a processing pipeline 400 for estimating dimensions of an enclosed space according to an example. In FIG. 4A, a camera device 410, which may comprise a monocular multi-directional camera device, captures a series or sequence of images 420 (each image is labelled with an "I"). These images 420 are captured at a plurality of different angular positions during at least one instructed movement of the robotic device, e.g. the images 420 may comprise video frames taken from a portion of video data that is recorded as a robotic device moves in the circular or circumferential motions shown in FIGS. 2A and 2B. In a video case, the images need not be consecutive video frames; instead they may comprise a subset of video frames that are selected according to at least one image processing criteria, e.g. such as meeting minimum contrast and/or focus metrics.

In FIG. 4A, the images 420 are accessed by a spatial estimator 430. The spatial estimator 430 is configured to process the images 420 to estimate the dimensions 440 of an enclosed space, e.g. to generate a room plan for the space. The spatial estimator 430 may form part of a controller (e.g. 120, 170) of a robotic device, or may comprise a computer device that is configured to receive images 420 from the camera device 410, e.g. either directly via a cabled connection or indirectly over a wireless network connection.

In one example, the spatial estimator 430 is configured to determine pose data from the sequence of images 420. In this case, the pose data indicates the location and orientation of the camera device 410 at a plurality of positions during the at least one instructed movement. In one case, the pose data is determined using a set of features detected within the sequence of images. The spatial estimator 430 is further configured to estimate depth values by evaluating a volumetric function of the sequence of images 420 and the pose data. The volumetric function may comprise a function to evaluate a dense omni-directional cost volume around a reference image, the reference image being determined from the pose data and having an associated reference position (e.g. a reference pose). Each depth value represents a distance from the camera device 410 to a surface in the space, e.g. an object in the form of a wall, table, door etc. In certain cases, to generate the depth values from the volumetric function, the spatial estimator 430 may comprise a depth estimator (or may comprise equivalent adaptations) as described in more detail below. The spatial estimator 430 is then configured to fit a three-dimensional volume, such as volume 330, to the depth values. The spatial estimator 430 is configured to fit the volume by optimizing dimensions of a two-dimensional polygonal cross-section of the three-dimensional volume, e.g. by determining values for $\underline{p}$ (as described with reference to FIG. 3A or 3B) that minimize a difference between a depth map determined using the volume and a depth map representing the aforementioned depth values. These depth maps may be represented as images and a gradient descent approach may be used to fit the volume, e.g. determine optimized values for the dimensions p. Having fitted the volume, the spatial estimator 430 outputs an estimate 440 for the dimensions of the enclosed space based on the optimized dimensions of the two-dimensional polygonal cross-section. For example, the spatial estimator 430 may output the optimized values for p and/or the length and width of an estimated room plan.

In certain examples, the camera device 410 may comprise an RGB camera device arranged to capture RGB images (or video frames). In one case, the camera device 410 comprises a charge-coupled device (CCD) or complementary metal-oxide-semiconductor (CMOS) sensor. In one experimental configuration, a Point Grey® Flea3 camera was used featuring a Sony® CMOS sensor. In this experimental configuration, the camera device was fitted with a Sony® RPUC2512 low-profile omnidirectional lens to provide multi-directional imaging.

In other cases, camera device 410 may comprise other available digital devices and/or an analogue device wherein images 420 are generated by converting analogue signal sources. Each image 420 may comprise a two-dimensional representation of measured data. For example, an image 420 may comprise a two-dimensional array or matrix of recorded pixel values. In the example of FIG. 4A, all images 420 are the same size, although this need not be the case in all examples. Pixel values may comprise Red, Green, Blue pixel values for a given resolution (e.g. 1280×1024). In other examples, other colour spaces may be used and/or images 420 may comprise mono or grayscale pixel values. In one case, image data may comprise a compressed video stream or file. In this case, frames of image data may be reconstructed from the stream or file, e.g. as the output of a video decoder. Image data may be retrieved from memory locations following pre-processing of video streams or files.

In one case, the camera device 410 may be arranged to store the images 420 in a coupled data storage device, e.g. a solid state memory device forming part of the robotic device. In another case, the camera device 410 may transmit image data 420 to a coupled computing device. The coupled computing device may be directly coupled, e.g. via a universal serial bus (USB) connection, or indirectly coupled, e.g. the images 420 may be transmitted over one or more computer networks. In yet another case, the camera device 410 may be configured to transmit the images 420 across one or more computer networks for storage in a network attached storage device. This transmission may be a wireless transmission, e.g. a wireless network or Bluetooth® connection. Images 420 may be stored and/or transmitted on a frame-by-frame basis or in a batch basis, e.g. a plurality of frames may be bundled together.

In certain cases, the spatial estimator 430 may form part of a robotic device, e.g. as shown in FIGS. 1A and 1B. In other cases, at least a portion of the spatial estimator 430 may be distributed, e.g. located on one or more coupled computing devices. For example, these computing devices may comprise part of a powered charging stations and/or a network-coupled computing resource.

Figure 4B:
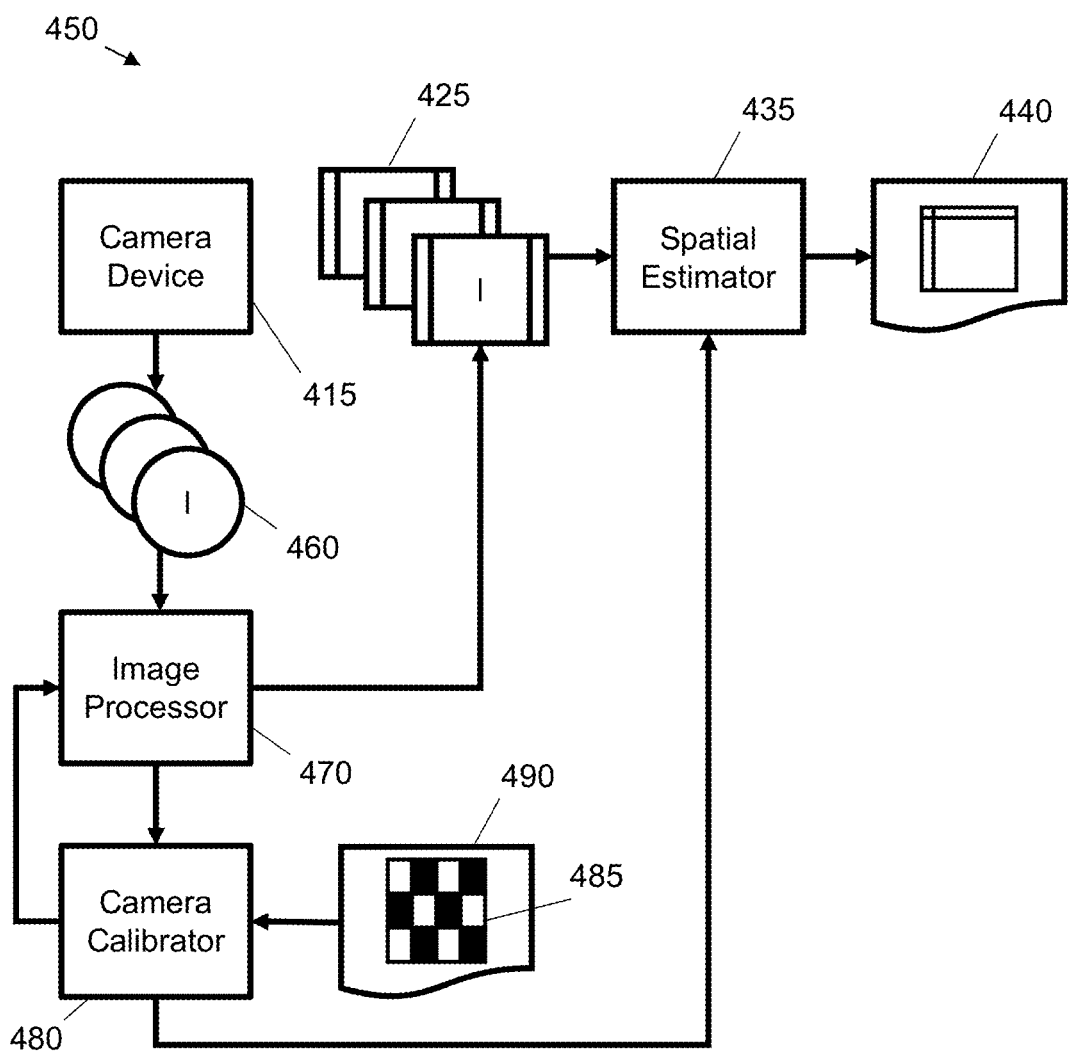

FIG. 4B shows a second example of a processing pipeline 450 that may be used to estimate dimensions 440 for an enclosed space, e.g. determine a room plan, in certain implementations. In the example of FIG. 4B, the camera device 415 comprises an omni-directional camera device, e.g. as may be implemented using the experimental configuration set out above. In this case, the camera device 415 generates raw omnidirectional images 460. For example, these may comprise circular images associated with an observed hemisphere of space. The processing pipeline 450 comprises an image processor 470 that is configured to receive the raw omnidirectional images 460. The image processor 470 unwraps the raw omnidirectional images 460 captured by the camera device 415 and outputs panoramic images 425 for use by the spatial estimator 435. The image processor 470 may use camera model parameters to perform the unwrapping. Unwrapping the raw omnidirectional images 460 facilitates subsequent pose and depth estimation operations. In one example, the image processor 470 may be configured to use a look-up table to implement the unwrapping and to create a spherically mapped panoramic image from each raw omnidirectional image for use in subsequent processing. In certain cases, sub-pixel interpolation may be used. Unwrapping raw omnidirectional images has a benefit that image dimensions fit well within memory of commercially available graphical processing units and that each pixel represents a uniform area on a surface of a sphere.

The processing pipeline 450 of FIG. 4B also comprises a camera calibrator 480. Although both an image processor and a camera calibrator are shown in FIG. 4B, in other examples, an image processor and a camera calibrator may be used separately. The camera calibrator 480 is configured to calibrate the camera device 415 by processing at least one captured image of a calibration pattern 485. The calibration pattern 485 may be present within the space, e.g. as a printed pattern or a liquid crystal display output visible within the space. In one case, the calibration pattern 485 may be present on a charging and/or docking station of a robotic device. The calibration pattern 485 may comprise a chequerboard pattern, e.g. of black and white squares. The camera calibrator 480 is configured to determine camera model parameters, i.e. parameters modelling the characteristics of camera device 415, by evaluating a function of captured image values and retrieved calibration pattern image properties. Retrieved calibration pattern image properties are determined from a retrieved representation 490 of the calibration pattern. In one case, the camera calibrator 480 may be configured to instruct the capture of a series (e.g. ten) images while the camera device 415 is moved around to cover an entire field of view. In this case, on each image a rough location of the pattern is provided (e.g. by a user or based on a known position such as a given distance from a docking station). Each image is then unwrapped to a rectangular patch and corners of the calibration pattern are detected. The coordinates of the corners are then recalculated to an original image space. The procedure is repeated for all of the series of images. From this, with a set of point pairs and initial parameter values, Levenberg-Marquardt non-linear optimization may be applied to minimize a function of the camera model parameters. In examples, camera model parameters may comprise at least one of: a mirror shape parameter, radial and tangential distortion coefficients and pinhole camera intrinsic parameters. Extrinsic parameters such as a rotation matrix and a translation vector may also form part of the camera model parameters; these may be estimated using motion as part of the pose estimation performed by the spatial estimator 435. In certain cases, these extrinsic parameters may represent six degrees of freedom. The camera model may comprise an adapted Geyer and/or Barreto catadioptric camera model, e.g. as described in C. Geyer, "Catadioptric Projective Geometry: theory and applications", PhD thesis, University of Pennsylvania, 2003 and J. P. d. A. Barreto, "General central projection systems: Modeling, calibration and visual serving", PhD thesis, University of Coimbra, 2004. Such a camera model may be similar to a pinhole model with the addition of an extra parameter determining a curvature of a lens mirror.

Example of System Components

Figure 5:
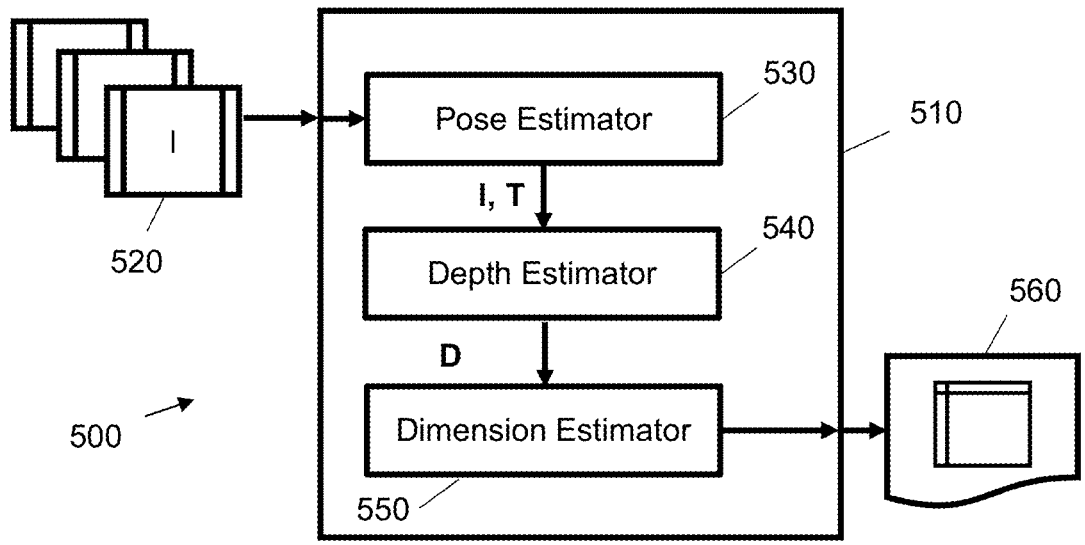
FIG. 5 is a schematic diagram showing certain components of a system for estimating dimensions of an enclosed space according to an example.

FIG. 5 shows an example 500 of a system 510 that may be used to estimate dimensions 440 for an enclosed space, e.g. determine a room plan. The system 510 may implement the spatial estimator 430, 435 of FIGS. 4A and 4B. The system 510 receives a sequence of images 520, e.g. as captured during a movement of the robotic device as described above. The sequence of images 520 may comprise unwrapped omni-directional images 425 as described with reference to FIG. 4B. The system 510 comprises at least three system components: a pose estimator 530, a depth estimator 540 and a dimension estimator 550.

The pose estimator 530 is configured to receive the sequence of images 530 and generate a set of pose estimates, T. A pose estimate may be generated for each received image 520 and may comprise values for a rotation matrix and a translation vector, e.g. the extrinsic camera model parameters. In certain cases, configuration operation, such as performed by camera calibrator 480 in FIG. 4B, may also determine a robotic device base/body to camera device transform, e.g. representing a mounting relationship between the camera device and the robotic device base. For certain static mountings this robotic device base/body to camera device transform may be regarded as an identity transform. The pose estimator 530 may be configured to extract features from the images 520, to match those features across the sequence of images 520 and to bundle adjust at least a set of initial pose estimates for the images 520 in order to generate the set of pose estimates, T. The pose data indicates the location and orientation of the monocular multi-directional camera device at a plurality of positions during the instructed movement The depth estimator 540 is configured to receive the sequence of images 520 and the set of pose estimates, T, from the pose estimator 530. In certain cases, pose estimation may not be possible for all images within the sequence 520. Using images that have available pose estimates, the depth estimator 540 in the present example is configured to evaluate a volume function to determine depth estimates, D. In one case, the depth estimator 540 is configured to evaluate a dense omni-directional cost volume around a reference image, the reference image being selected from the sequence of images 520. In this case, depth values may be calculated for a set of pixels of the reference image. In these cases, the reference image relates to a reference position, e.g. a location and orientation from a reference pose. The depth values thus represent distances from the reference position to surfaces in the enclosed space. Depth values may be selected that minimize brightness discrepancies with a set of comparison images from the sequence of images 520. In one example, certain pixels may be ignored when evaluating depth values. This may be thought of as a filtering or selection of depth values so as to only consider depth estimates that have an associated high accuracy or confidence for future processing. One example approach for performing this filtering is described later with reference to FIGS. 9A and 9B.

The dimension estimator 550 is configured to receive the depth estimates, D, and to fit a three-dimensional volume to the depth values from the depth estimator by optimizing dimensions of a two-dimensional polygonal cross-section of the three-dimensional volume. The dimensions of the two-dimensional polygonal cross-section determined by the fitting of the three-dimensional volume are used to output an estimate 560 for the dimensions of the enclosed space. For example, the estimate 560 may comprise data defining a box on a room plan, wherein the dimensions of the box are set based on the dimensions of the two-dimensional polygonal cross-section (e.g. as shown in FIGS. 3A and 3B).

In one case, the dimension estimator 550 may receive data defining a reference position, e.g. a reference pose, from one of the pose estimator 530 and the depth estimator 540. In one case, depth values for pixels of a reference image may form a depth map. In a case with unwrapped images, e.g. as described with reference to FIG. 4B, each column of an estimated depth map (i.e. each column of depth values) represents a different viewing angle or angular position with reference to a camera device. If an omni-directional camera device is used, a depth map may be associated with an unwrapped spherical image, and as such, each column of the depth map represents a different viewing angle or angular position around a 360 degree field of view.

In one case, the dimension estimator 550 is configured to fit the three-dimensional volume by optimizing, with regard to the dimensions for the polygonal cross-section, a function of an error between: a first set of depth values (i.e. D) from the evaluation of the volumetric function of the image data and the pose data, and a second set of depth values estimated from the reference position to the walls of the three-dimensional volume. The second set of depth values may be determined by ray tracing from the reference position to the boundary of the three-dimensional volume, e.g. by determining when a ray emitted from the reference position intersects with the edge of the volume. In one case, the function of the error is evaluated by comparing a depth image (i.e. a first depth map) with pixel values defining the first set of depth values with a depth image (i.e. a second depth map) with pixel values defining second set of depth values.

In one example, the dimension estimator 550 is configured to use a triangular three-dimensional model and perform per pixel ray-tracing to compute the second depth map. For example, for each pixel from the first depth map (e.g. D), the dimension estimator 550 is configured to iterate through the triangles of the three-dimensional model, check ray-triangle intersection and calculate a resulting depth for a given set of dimensions $d_b(\underline{p}, u, v)$ at which the intersection occurs (where u and v represent the x and y co-ordinates of a pixel in the first depth map). In certain cases, z-buffer logic may be used to determine a closest surface when ray-tracing, e.g. with complex room shapes where one surface stands in front of another surface. In a case with a rectangular cross-section, a ray-plane intersection may be determined without z-buffer logic. An error function may then evaluate, on a per pixel basis, the difference between $d_b(\underline{p}, u, v)$ and a measured depth value $d_m(u, v)$, e.g. a value from the first depth map D. In one example, the error function may comprise an asymmetric Cauchy loss function as described in more detail with reference to FIG. 11.

In one example, the dimension estimator 550 applies automatic differentiation to determine partial derivatives that are used to fit the three-dimensional volume. A number of libraries are available that apply automatic differentiation (also known as algorithmic or computational differentiation) for a given programming language. Automatic differentiation applies the chain rule to determine partial derivatives for functions expressed in lines of computer code. In one case, automatic differentiation is applied with forward accumulation to compute Jacobians, wherein said Jacobians are used to optimize the function of the error between the first and second sets of depth values. In one case, partial derivatives are computed using automatic differentiation for calculations performed by the dimension estimator 550 (such as one or more of: triangular mesh generation, ray-triangle intersection, camera projection, and residual and loss function computation). These partial derivatives are carried with respect to the parameters of the three-dimensional volume, e.g. p. Partial derivatives may be determined for functions that are evaluated on one or more of a central processing unit (CPU) and a graphics processing unit (GPU). In one case, after computing each per pixel residual from the error function, the error function is optimized by summing the residual value and the partial derivatives with a GPU reduce operation. An error function value, together with a Jacobian from automatic differentiation, may be used in a Levenberg-Marquardt optimization scheme to estimate the dimensions of the cross-section that best fit, in terms of the three-dimensional volume, the measured depth values, D.

In certain cases, the sequence of images 520 comprises batches of images from multiple movements (e.g. as in the example of FIG. 2B). In this case, the pose estimator 530 and depth estimator 540 may operate on each of these batches. In one implementation, the depth estimator 540 may be configured to estimate depth values in association with a reference image for each batch, wherein a batch corresponds to one of the movements 270, 280, 290. In this case, comparison images may also be selected from a corresponding batch of images. Multiple depth maps, each corresponding to a particular batch and movement, may then be generated by the depth estimator 540 and passed to the dimension estimator 550. In this case, the dimension estimator 550 is configured to determine dimensions for a plurality of cross-sections, each cross-section corresponding to a different depth map from the depth estimator 540. Multiple fitted cross-sections may be used for room demarcation or complex shape fitting. This is described in more detail below.

The system 510 may be seen to combine "sparse" and "dense" image processing in a manner that enables a room plan to be generated in real-time without onerous computing requirements. In this case, the pose estimator 530 may be seen to apply "sparse" processing, e.g. processing that utilizes key-points or extracted features. These key-points and extracted features are of a limited number in comparison with full volumetric models that may comprise a large number of voxels to model the space. "Sparse" processing based on extracted, matched and bundle adjusted features has an advantage that it is quicker to process than comparative "dense" pose estimation techniques. The use of a reference image enables relatively "dense" depth maps to be determined, e.g. wherein depth values are determined on a pixel-by-pixel basis, while reducing the computational load. Additionally, use of filtered depth values or "semi-dense" depth maps further speed up processing. Filtered or "semi-dense" depth maps based on an accuracy or confidence of the depth values further addresses a problem of mapping spaces with textureless areas. In these cases, textureless areas, e.g. walls of an empty room, may have little information content for depth estimation. This may result in unreliable estimates that can lead to incorrect room dimension measurements. However, such depth values are filtered in certain cases, and as such they are not used to estimate the room dimensions.

In one case, the system 510 may acquire the sequence of images 520 via an image acquisition interface. This may be coupled to the camera devices 110, 160, 410, 415 of the previous examples. The image acquisition interface may comprise a hardware interface, such as a USB or network interface, and computer program code implementing software drivers. In one case, the system 510 may be configured to operate on streaming data, e.g. live video data. In another case, the system 510 may be communicatively coupled to the camera device and be arranged to store images 520 received from the camera device in one or more of persistent and non-persistent data storage, e.g. frames of data may be copied into memory and/or may be stored in a hard disk drive or solid state storage. In another case, images 520 may be stored externally to the system 510 in a given file format, e.g. in one or more files accessible in a data storage device. In this case, the system 510 may use or implement part of a file system to at least read data from the one or more files. The system 510 may comprise dedicated processing electronics and/or may be implemented by way of computer program code executed by a processor of at least one computing device.

In cases such as those shown in FIGS. 1A and 1B, the system 510 may comprise one or more embedded computing devices. This may comprise at least one processor operating in association with memory to execute computer program code loaded onto a computer readable medium. This medium may comprise solid state storage such as an erasable-programmable-read-only memory and the computer program code may comprise firmware. In other cases, the system 510 may comprise a suitably configured system-on-chip, application-specific integrated circuit and/or one or more suitably programmed field-programmable gate arrays. In one case, the system 510 may be implemented by way of computer program code and/or dedicated processing electronics in a mobile computing device and/or a desktop computing device; in this case, the system 510 may be configured to receive images transmitted from a robotic device and/or to transmit determined room dimensions back to the robotic device. Other implementations of distributed computing may also be used without deviating from the described examples herein. In one case, system 510 may be implemented, in whole or in part, as well as or instead of the previous cases, by one or more GPUs executing computer program code. In certain cases, the system 510 may be implemented by way of one or more functions implemented in parallel, e.g. on multiple processors and/or cores of a GPU.

Example Methods for Estimating Dimensions of an Enclosed Space

Figure 6:
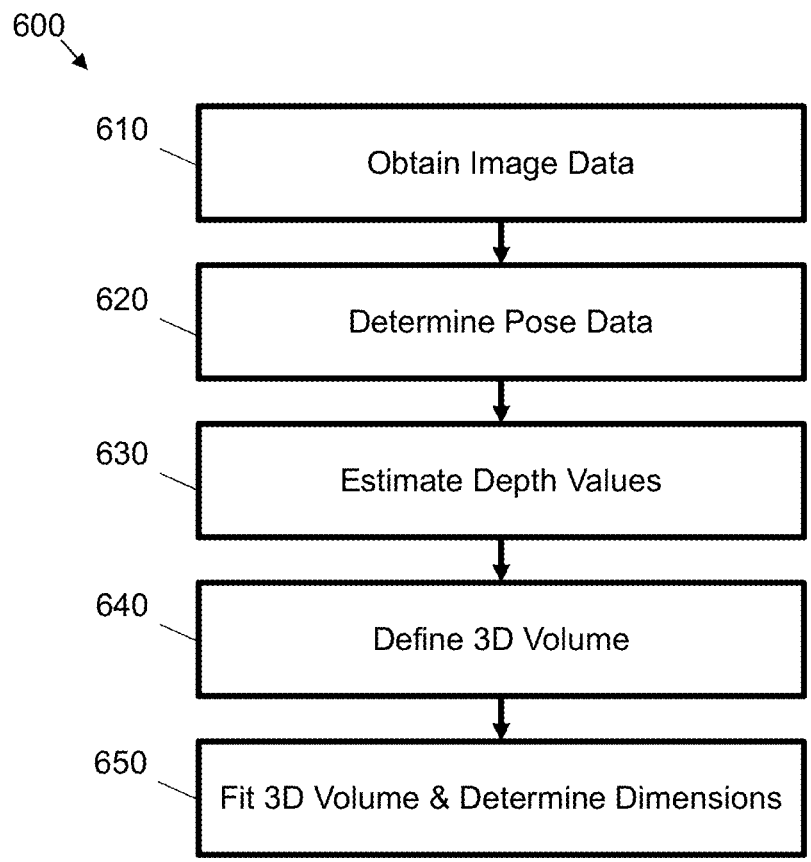
FIG. 6 is a flow diagram showing an image processing method for estimating dimensions of an enclosed space according to an example.

FIG. 6 shows an image processing method for estimating dimensions of an enclosed space according to an example. This method may be applied by the system components of the aforementioned examples or any other suitable computing device.

At block 610, image data is obtained from a monocular multi-directional camera device. This may be a camera device coupled to a robotic device or a mobile computing device. In one case, the camera device may be coupled to a robotic device in the form of a domestic robot. As in previous examples, the monocular multi-directional camera device is arranged to capture image data from a plurality of viewpoints or angular positions. The image data comprises a sequence of images, e.g. a set of video frames, having disparity within a plane of movement of the camera device, e.g. horizontal disparity for floor-located devices. The plane of movement of the camera device may comprise a plane of movement for a robotic device.

At block 620, pose data corresponding to the image data is determined. The pose data indicates the location and orientation of the monocular multi-directional camera device, e.g. rotation and translation parameter values in up to six degrees of freedom. In certain cases, the degrees of freedom may be constrained, e.g. in certain implementations movement may be assumed to reside in a floor plane and as such there may be no translation along the z-axis and rotation may be restricted to being around the z-axis. In the present example, the pose data is determined using a set of features detected within the image data.

At block 630, a set of depth values are estimated by evaluating a volumetric function of the image data from block 610 and the pose data from block 620. Each depth value in this case represents a distance from a reference position of the monocular multi-directional camera device to a surface in the space. The reference position may be associated with a reference pose that is determined to evaluate the volumetric function.

At block 640, a three-dimensional volume is defined around the reference position of the monocular multi-directional camera device. The three-dimensional volume has a two-dimensional polygonal cross-section within the plane of movement of the camera device. The defining operation at block 640 may comprise retrieving parameter values for a predefined polygon, e.g. a box or the like. In a first iteration of the method 600, the parameter values may be initialized. The three-dimensional volume may be defined by the parameters, $\underline{p}=[x_-, x_+, y_-, y_+, \theta]$, and a predefined height value. Values for a location and orientation that define the reference position may be passed from block 630.

At block 650, the defined three-dimensional volume is fitted to the depth values to determine dimensions for the polygonal cross-section. This may comprise optimizing a cost function with respect to the dimensions. This may determine a set of dimensions that have a corresponding three-dimensional volume that best fits the depth values determined at block 630, e.g. determine values for parameters $\underline{p}=[x_-, x_+, y_-, y_+, \theta]$. These parameters may then be used to define the extent of the space mapped by the method 600.

In one case, the determined dimensions for the polygonal cross-section may be used to define a room plan for the enclosed space (e.g. in terms of a length and width for a room defined as a box). The room plan may be used by a robotic device to understand the space or may be displayed as a measurement to a human operator, e.g. on a display of a (mobile) computing device.

In one case, fitting the three-dimensional volume to the depth values comprises optimizing, with regard to the dimensions for the polygonal cross-section, a function of an error between a first set of depth values from block 630, and a second set of depth values estimated from the reference position to the walls of the three-dimensional volume. In one case, the depth values from block 630 may be output in the form of a depth map, i.e. an image of W pixels by H pixels where each pixel value represents a depth value (e.g. the image may comprise a grayscale image). In this case, each measured depth value from block 630 may be defined as a pixel value $d_m(u, v)$, where u and v comprise values for x and y coordinates for the image. Each pixel value $d_m(u, v)$ may be compared to a pixel value from a fitted-volume depth map $d_b(\underline{p}, u, v)$, where the fitted volume depth map is computed using per pixel ray tracing. In certain cases, the depth values from block 630 may be pre-processed to remove points below and above respective predefined floor and ceiling planes. Removal of these point may help to remove noise, wherein the points typically do not form part of the room shape estimation.

In one example, a residual (R) of a cost function (F) may be defined as:

$$R=F(d_b(\underline{p},u,v)-d_m(u,v))$$

These residuals may then be summed in a final energy function, which is minimized over the extent of the depth map from block 630 (i.e. across W and H) with respect to $\underline{p}$:

$$\min_{\underline{p}} \sum_{u,v} F(d_b(\underline{p}, u, v) - d_m(u, v))$$

As described above, automatic differentiation may be used to compute the partial derivatives to minimize the sum of the residuals with respect to the parameters of the polygonal cross-section.

In certain examples, a coordinate descent approach is used that evaluates the distances from the reference position to respective sides of the cross-section ($x_-, x_+, y_-, y_+$) before the angle of rotation of the cross-section with respect to the reference position ($\theta$). This may yield faster convergence and improved fitting.

Methods for Determining Pose and Depth Data

Figure 7:
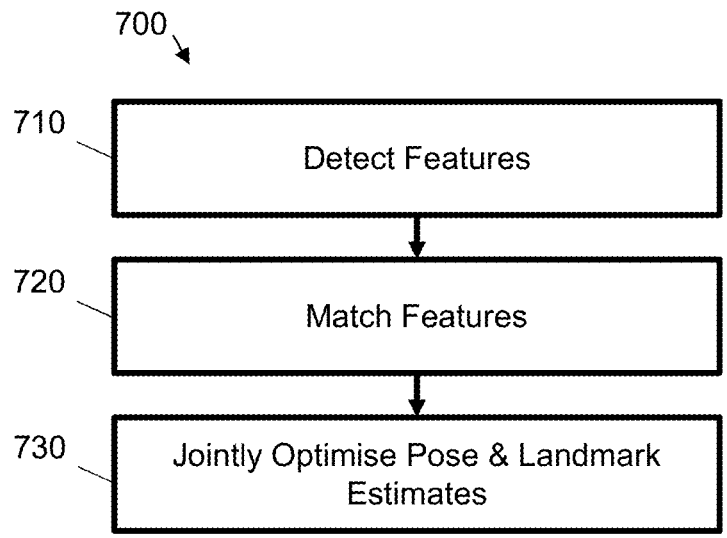
FIG. 7 is a flow diagram showing a method of estimating pose data for a camera device according to an example.

FIG. 7 shows a method 700 that may be used to implement block 620 in certain implementations.

At block 710, one or more features are detected in each of a plurality of images in the sequence of images obtained at block 610. In one case, features may be detected with a FAST (Features from Accelerated Segment Test) corner detector as described by E. Rosten and T. Drummond in "Machine learning for highspeed corner detection" in the Proceedings of the European Conference on Computer Vision (ECCV), 2006. This provides high-speed feature detection suitable for real-time video processing. Features may be detected in each image, e.g. each frame of video data, or selected subset of images (such as every $x_{th}$ frame of a video feed). Feature may be described using scale-invariant feature transform (SIFT) descriptors, e.g. as described by D. G. Lowe in "Distinctive image features from scale invariant keypoints" in the International Journal of Computer Vision (IJCV), 60(2):91-110, 2004. Other features detectors and/or descriptors may be used.

At block 720, the detected features from block 710 are matched across the plurality of images to determine a set of landmarks within the image data. Landmarks in this case comprise points of correspondence between images, e.g. a landmark may relate to static portions of an object within the space that is captured in several successive images as a robotic device moves around the space, e.g. a corner of a piece of furniture, a picture on a wall, or a part of a chair. This block may comprise a feature-based motion estimation operation that runs iteratively and, with each new image (e.g. a new frame of video data), matches newly detected features in the new image against a list or map of existing landmark features. If no match is found, e.g. if detected features comprise completely new features, then a new landmark entry in the list or map may be added. Features may be matched in an inner filtering loop against a current landmark list or map, based on a reprojection error in the image plane and a SIFT descriptor distance.

At block 730, a set of camera pose estimates and a set of landmark location estimates for the sequence of images are jointly optimized. The pose data output by block 620 in FIG. 6 then comprises the set of camera pose estimates following joint optimization. Joint optimization may comprise minimizing an energy function with at least a visual part that imposes constraints between camera pose estimates, landmark locations and their respective matched features. The energy function may comprise a binary term that indicates whether a particular feature i is seen in an image j. The visual part of the energy function may evaluate a difference between a predicted feature value (e.g. a predicted pixel value associated with feature i for image j) and an actual feature value (e.g. an actual pixel value associated with feature i for image j). This difference may be evaluated over n features and m images. The predicted feature value may be computed based on a projection, using camera parameters, of a rotation matrix applied to a landmark position minus the rotation matrix applied to a translation vector. This may be applied using initial pose estimates for each image in the sequence of images, each initial pose estimate comprising initial values for the rotation matrix and translation vector with respect to the image. The visual part may use the Huber norm to normalize the differences.

In implementation, odometry data from the robotic device may be used to constrain an optimization function. Odometry is the use of data from motion sensors to estimate a change in position over time. Odometry data may arise from the at least one movement actuator of the robotic device, e.g. tracking the position of wheels 115 or tracks 165 in FIGS. 1A and 1B. The optimization function may comprise the energy function described above. In that case, the energy function may have an additional odometry part (e.g. an odometry term). The odometry part may evaluate a difference between a change in translation vectors between consecutive images and a change in odometry vectors associated with times the consecutive images were captured. This is equivalent to considering a difference between movement as indicated by the translation vectors and movement as indicated by odometry data, the movement occurring between the capture of the two consecutive images (e.g. a distance between images or frames of video data). This method may be applied even if odometry is not captured with image capture, which reduces a need for advanced control processing. Additionally or alternatively, odometry data, if available, may be used to initialize one or more pose estimates, e.g. within the joint optimization. Standard deviations from a precision matrix may be used to weight both terms in the energy function. The differences in the odometry part may be weighed and made robust using the Cauchy loss function. The energy function as described may be optimized using an iterative Levenberg-Marquardt function with the Jacobians calculated by means of auto-differentiation.

In one implementation the joint optimization may comprise a bundle adjustment. The bundle adjustment may be an adaptation of the methods described by Bill Triggs et al. in "Bundle adjustment—a modern synthesis", Vision algorithms: theory and practice, Springer Berlin Heidelberg, 2000, 298-372. This may use non-linear optimization.

In certain cases, features may be first matched by way of putative matches. Preliminary bundle adjustment may then be applied to these putative matches. A putative match may then be rejected if its reprojection error is too large. This selection and rejection may be repeated multiple times before a final bundle adjustment is performed. In one case, to generate new landmarks, the image is divided into a number of patches (e.g. 16). Features in the form of keypoints may then be selected in such a way that in each patch at least a predefined number of features are retained (e.g. 5), that are each at least a given number of pixels away from all others (e.g. 10 pixels). This particular operation can contribute to a uniform distribution of high quality features to track. New landmarks may be initialized as a given distance away (e.g. 7.5 m depending on the environment) and when later matched they are bundle adjusted to the correct depth.

Figure 8:
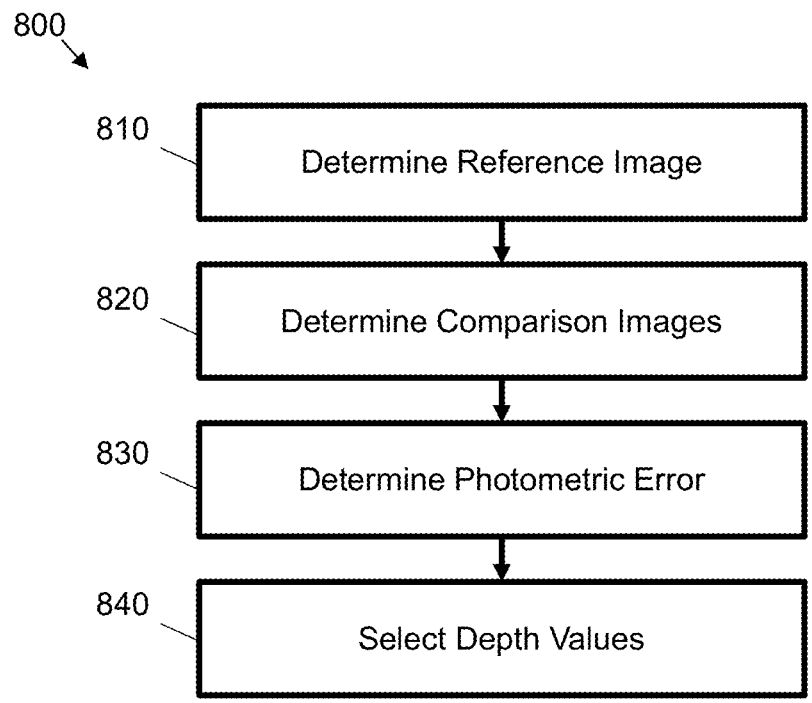
FIG. 8 is a flow diagram showing a method of estimating depth values according to an example.

FIG. 8 shows another method 800 that may be used to implement block 630 in certain implementations. The method 800 may be implemented as well as, or independently, of the method 700.

At block 810, a reference image is determined from the sequence of images obtained at block 610. In one case, if images are captured along a circle or arc movement path, then a reference image may be selected from near the middle of the circle or arc such that additional images are present that correspond to either side of the reference image (e.g. that are captured before and after the determined reference image). In other cases, for example those using an omnidirectional and/or full circular motions, the reference image may be selected at random from the captured images or selected based on one or more image quality metrics. At block 820, a set of comparison images that overlap with the reference image are determined. Overlap may be defined as at least one pixel in a comparison image which contains image data from a portion of the space that is also imaged, e.g. from a different orientation and/or location, in a pixel of the reference image (although the location of the pixel may vary between the reference image and a comparison image). At block 830, a photometric error is determined between image values for the reference image and projected image values from the set of comparison images. The photometric error may be based on a normalized pixel photometric error.

Each projected image value comprises a projection of a comparison image to a viewpoint of the reference image using pose data for the reference image and pose data for the comparison image, e.g. a reprojection of the comparison image data to the point of view of the reference image. At block 840, depth values are selected that minimize the photometric error. For example, the projection of the comparison image may comprise a scalar depth term, d. The photometric error may involve subtracting a (re)projected pixel value using the depth term, camera parameters and pose estimate from a pixel value taken from the reference image. This may be normalized using the Huber norm and evaluated per comparison image, with the total error being the sum of the error for the set of comparison images. The photometric error may be weighted by a number of successful (re)projections. To select a depth value, a set of photometric errors for different depth values, d, may be searched until a minimum photometric error is located, wherein the depth value associated with the minimum photometric error is selected for the pixel.

The method 800 may be seen to use a "cost volume" wherein each voxel accumulates squared photometric error between images. The method 800 may be seen as an adaptation of the methods described by R. A. Newcombe, S. Lovegrove, and A. J. Davison in "DTAM: Dense Tracking and Mapping in Real-Time", in the Proceedings of the International Conference on Computer Vision (ICCV), 2011.

In certain cases, when applying a method such as 800 in FIG. 8, regularisation cost terms may be applied to obtain a smooth and fully dense depth map. This regularisation may be performed using a Huber Rudin-Osher-Fatemi (ROF) Total Variation (TV) L1 regulariser. However, this may lead to problems where certain image regions are badly conditioned for depth estimation. For example, this may be the case where image regions lack texture. These image regions may lead to unreliable depth value estimates, even when regularisation is applied. Based on this, in certain implementations, one or more variance measures are determined for estimated depth values; these variance measures are then used to filter the estimated depth values, wherein room shape estimation is based on the filtered depth values. This then acts to extract only useful or accurate depth information, e.g. in the form of a "semi-dense" representation where only a subset of depth values are used. This may alleviate the need to perform regularisation, thus simplifying the method and reducing computation requirements. Also using a regulariser such as the Huber ROF TV L1 regulariser may lead to poor performance in spaces with a significant number of textureless areas, e.g. representing blank walls in an (empty) room, and/or lead to oversmoothing. By using a "semi-dense" approach as described herein, only accurate (e.g. "trusted") measurements with a high confidence or reliability are used. This leads to good performance even in spaces with large areas that lack substantial texture (e.g. as represented by pixel variation), such as empty rooms or rooms with blank walls or partitions. In tests it was found that many environments resulted in a substantial proportion of the three-dimensional depth map having unreliable measurements. By using the methods of the present examples these unreliable measurements are not used and room shape estimates are more reliable.

In the example of FIG. 8, filtering or selecting estimated depth values may comprise selecting only a subset of pixel depth values that are computed for the reference image. In certain cases, the variance measures comprise standard deviations for pixel depth measurement associated with a reference image. In these cases, filtering the estimated depth values comprises using depth estimates that have a standard deviation value that is below a predefined threshold.

Figure 9A:
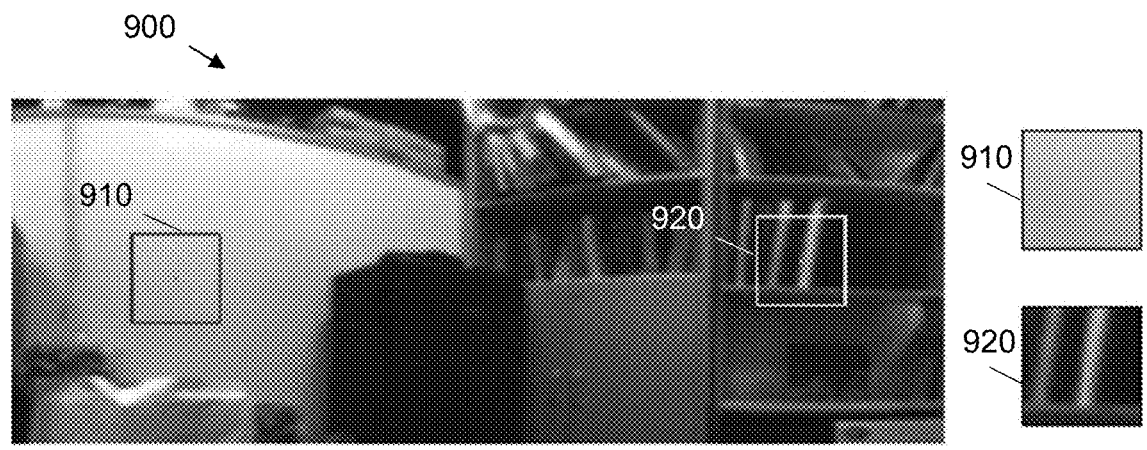
FIG. 9A is an example image from a robotic device showing two areas with different image characteristics.

FIG. 9A shows an example image portion 900. The image portion 900 may form part of an unwrapped panoramic image (e.g. a reference image) as described herein. The image portion 900 has two highlighted areas: a first area 910 and a second area 920. The first area 910 is relatively smooth and textureless (e.g. low texture); it captures an image of a back of a wall of a desk unit. As such the first area 910 may not generate an accurate depth measurement. The second area 920 has detail (e.g. high texture) that may be used to generate an accurate depth measurement. In FIG. 9A the second area 920 captures an image of part of a bookshelf. These two areas 910, 920 have different energy responses in their respective cost volume depth sampling.

Figure 9B:
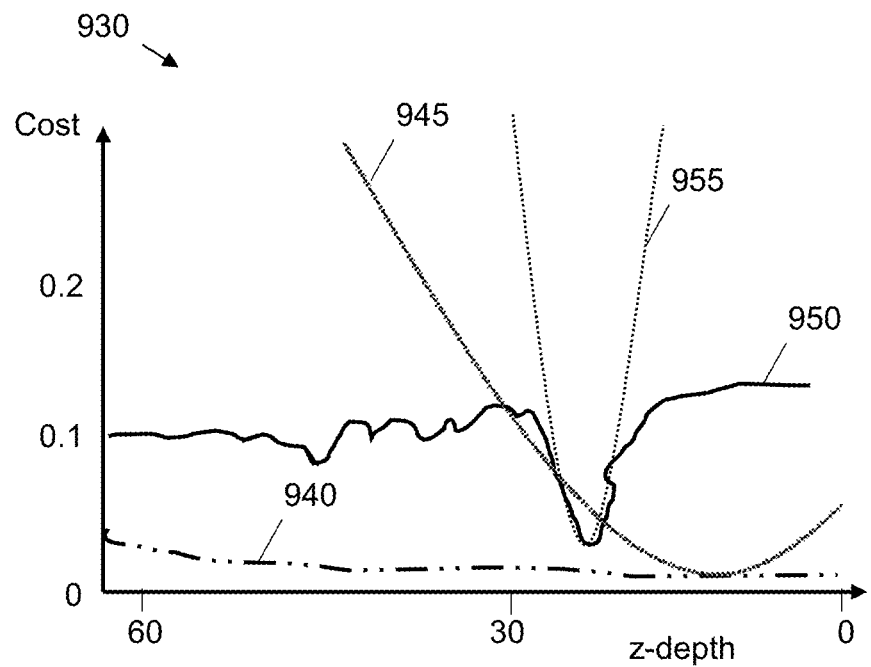
FIG. 9B is a chart showing depth values for the two areas of FIG. 9A according to an example.

In one case, the standard deviation of a depth estimate may be estimated by fitting a graph to the cost function. FIG. 9B shows an output 930 of a cost-function for the two areas 910, 920 of FIG. 9A. A cost function value is plotted on the y axis against depth values (e.g. d or z-values) on the x axis. A first output 940 is shown for the first area 910. As may be seen the first output 940 has relatively small cost function values, ranging from about 0.025 to 0.005 in an approximately linear manner. A second output 950 is then shown for the second area 920. As may be seen the second output 950 differs from the first output 940: there is variation around a cost value of 0.1 with a dip in the cost function at around a z-value of around 20.

In the above described methods a depth value may be estimated by selecting a minimum value of the cost function. As may be seen in FIG. 9B this is difficult for the relatively flat first output 940. However, there is a clear minimum around a depth value of 20 for the second output 950. By fitting a parabolic function to each of the first and second outputs 940 and 950, it is possible to determine a minimum value that may be used for the depth estimate as well as a standard deviation that may be used to filter the depth estimate. Fitting a parabolic function moreover allows for subpixel depth resolution (e.g. as the minimum of the parabola may be selected as a continuous value). FIG. 9B shows a first parabola 945 fitted to the first output 940 and a second parabola 955 fitted to the second output. By fitting a quadratic function to the output of the cost function the shape of a parabola, in the form of the 'a' parameter of the function (e.g. $y=ax^2+bx+c$), may be determined. From this the standard deviation for a pixel in the inverse depth domain may be calculated as the inverse of the square root of the 'a' parameter. This may then be converted into a standard deviation in the depth domain by dividing by the square of the depth estimate (e.g. the subpixel depth value associated with the minimum of the fitted quadratic function). Although in this example a quadratic/parabolic function is used in other examples other appropriate functions may alternatively be fitted, depending on the nature of the images. Following calculation of the standard deviation in the depth domain, thresholding may be applied, wherein depth estimates with standard deviations above a given threshold are discarded (e.g. filtered out) for subsequent processing. In one case thresholding may be applied to retain a particular percentage of an image area (e.g. 50%). Following filtering of depth values, e.g. depth values associated with pixels of a reference image, a subset of the depth values remain, e.g. corresponding to a subset of said pixels, thus resulting in a "semi-dense" depth map. In certain implementations, depths may be represented in inverse form and/or depth ranges may be sampled into a number of cost volume bins (e.g. 64 in one test example). In certain cases, the depth map comparisons performed when optimizing an error function may be performed for filtered depth values, e.g. certain depth values in the depth map that do not survive the thresholding are not used to compute room dimensions.

In certain cases, omni-directional cameras provide wide field of view coverage and ease of correspondence during extended movements, while the described examples minimize the effect of relatively low angular resolution and hard-to-calibrate projection characteristics that may be experienced when using such devices. The processing methods described above overcome a challenge of implementing a working method using the unconventional geometry found with multi-directional cameras. In certain examples described herein, a feature-based matching and bundle adjustment procedure provides accurate estimates of the pose of each image. These are then used to construct an omnidirectional photoconsistency cost volume, e.g. based on 100-160 frames. The cost volume is used to generate an omnidirectional depth map which can be transformed into a dense three-dimensional vertex map. Certain examples described herein enable passive reconstruction indoors in spaces that have textureless areas, and minimizes a problem of an omnidirectional depth map (and corresponding dense three-dimensional geometry estimates) having poorly-estimated areas where depth is unreliable, even when regularisation is applied. In these examples, depth standard deviation may be estimated from the cost volume data and a threshold applied to extract only semi-dense high-quality information. This procedure furthermore obviates the need for regularisation. While certain comparative methods allow depth estimation, these typically require advanced hardware such as depth cameras, laser scanners or stereo vision systems. Certain examples described herein overcome a challenge of providing information for navigation using a standard RGB passive camera device.

Example Machine-Readable Instructions

Figure 10:
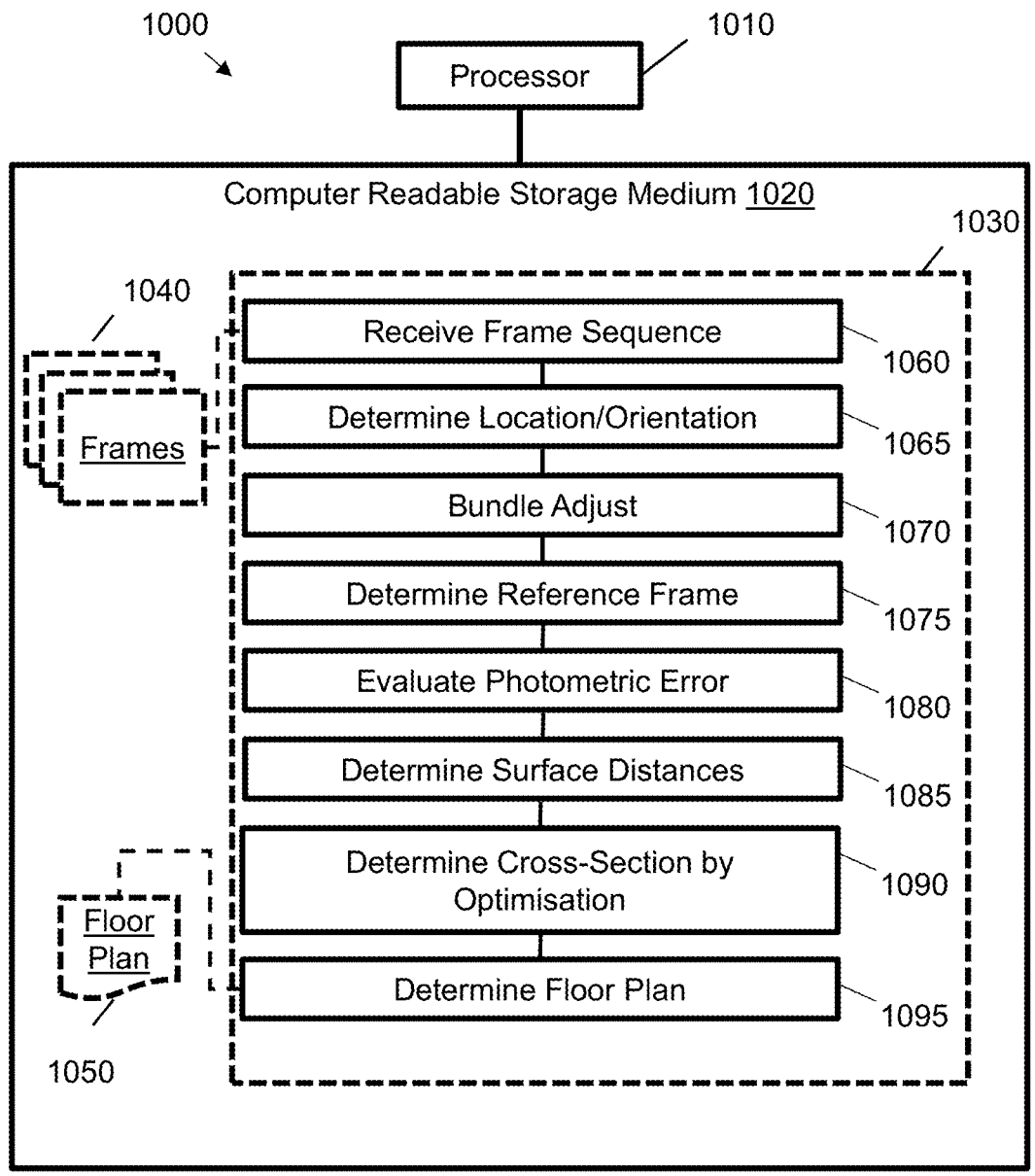
FIG. 10 is a schematic diagram showing a non-transitory computer readable medium according to an example.

Certain system components and methods described herein may be implemented by way of computer program code that is storable on a non-transitory storage medium. FIG. 10 shows a particular example 1000 of a system comprising at least one processor 1010 arranged to retrieve data from a computer-readable storage medium 1020. The system may comprise part of a server or mobile computing device, or part of a robotic device as described above. The computer-readable storage medium 1020 comprises a set of computer-readable instructions 1030, stored thereon. The computer-readable storage medium 1020 in the present example is also configured to store frames of image data 1040 and floor plan 1050. In other examples, components 1030, 1040 and 1050 may be stored in separate mediums. The floor plan 1050 may comprise room dimensions, e.g. as illustrated in FIGS. 3A and 3B or 13A to 13C, for one or more rooms. In one case, the room plan may define room dimensions for a plurality of rooms in a building, such as a home or office.

In use, the at least one processor 1010 is configured to load the instructions 1030 into memory for processing. The instructions 1030 are arranged to cause the at least one processor 1010 to perform a series of actions. These actions comprise causing the processor to receive, at instruction 1060, a sequence of frames 1040 from a monocular multi-directional camera. In this example, the multi-directional camera is arranged to capture image data for each of the frames from a plurality of angular positions, the sequence of frames being captured at different angular positions within a plane of movement for a space. The actions further comprise causing the processor to determine, at instruction 1065, location and orientation estimates for the camera for each frame by matching detected features across the sequence of frames. Instruction 1070 then comprises bundle adjusting the location and orientation estimates for the camera and the detected features across the sequence of frames to generate an optimized set of location and orientation estimates for the camera.

Following bundle adjustment, instruction 1075 results in an action to determine a reference frame from the sequence of frames. The reference frame has an associated reference location and orientation (i.e. an associated pose). Instruction 1080 then results in an action to evaluate a photometric error function between pixel values for the reference frame and projected pixel values from a set of comparison images that overlap the reference frame. In this case, said projected pixel values are a function of an object distance from the camera and the optimized set of location and orientation estimates for the camera. Via instruction 1085, the processor 1010 is configured to determine a first set of surface distances for different angular positions corresponding to different pixel columns of the reference frame based on the evaluated photometric error function. Via instruction 1090, the processor then is instructed to determine parameters for a planar rectangular cross-section of a three-dimensional volume enclosing the reference location by optimizing an error between the first set of surface distances and a second set of surface distances determined based on the three-dimensional volume. Via instruction 1095, the processor is instructed to determine the floor plan 1050 for the space using the determined parameters for the planar rectangular cross-section. As such, the machine-readable instructions 1030 may be used to perform certain examples described above, e.g. as part of firmware for a robotic device.

In certain cases, the monocular multi-directional camera comprises an omni-directional camera and each frame comprises an unwrapped omni-directional image. The omni-directional camera may comprise a panoramic-annular-lens. The sequence of frames may be received from a mobile video camera that is moved circumferentially within the space.

In certain cases, the instructions are repeated to determine parameters for a plurality of planar rectangular cross-sections. In this case, the instructions to determine a floor plan comprise instructions to determine a floor plan for at least one room based on a union of the plurality of planar rectangular cross-sections. This is described in more detail with reference to FIG. 13C below. In another case, the instructions comprise instructions to determine a spatial overlap of the plurality of planar rectangular cross-sections and determine room demarcation for the space based on the spatial overlap. For example, if boxes are determined to overlap by greater than a predefined amount, they are considered as different portion of the same room; comparatively, if boxes are determined to overlap by less than a predefined amount, they are considered to relate to different rooms. Hence, a union of cross-sections may be enacted based on an overlap value.

Asymmetric Loss Function

Figure 11:
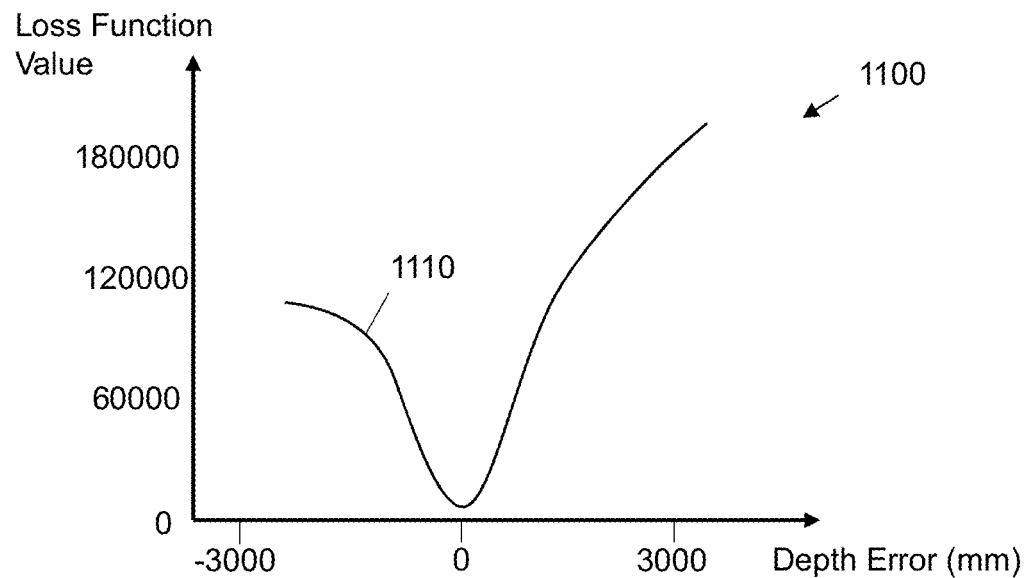
FIG. 11 is a chart showing an asymmetric error function according to an example.

FIG. 11 shows an example asymmetric loss function. This loss function may be used as the function 'F' described above. In FIG. 11, the loss function comprises an asymmetric Cauchy loss function defined by two parameters $c_n$ and $c_p$ and an error, e, wherein the error is the error between $d_b$ and $d_m$ as set out above. For example, the loss function may be defined as:

$$F(e, c_n, c_p) = \begin{cases} \frac{c_n^2}{2} \log\left(1 + \left(\frac{e}{c_n}\right)^2\right), & \text{if } e < 0 \\ \frac{c_p^2}{2} \log\left(1 + \left(\frac{e}{c_p}\right)^2\right), & \text{otherwise} \end{cases}$$

The asymmetric function returns higher values when the first set of depth values (e.g. those from block 630 or depth estimator 540) are greater than the second set of depth values (e.g. those from ray tracing to a modelled volume) as compared to when the first set of depth values are less than the second set of depth values. This is selected such that more attention is paid to depth data (e.g. from block 630 or depth estimator 540) that is further away than predicted by the fitted volume, i.e. wherein less attention is paid to depth data that is closer to the camera device than predicted by the fitted volume (which may be due to furniture or other clutter).

Another System Example

Figure 12:
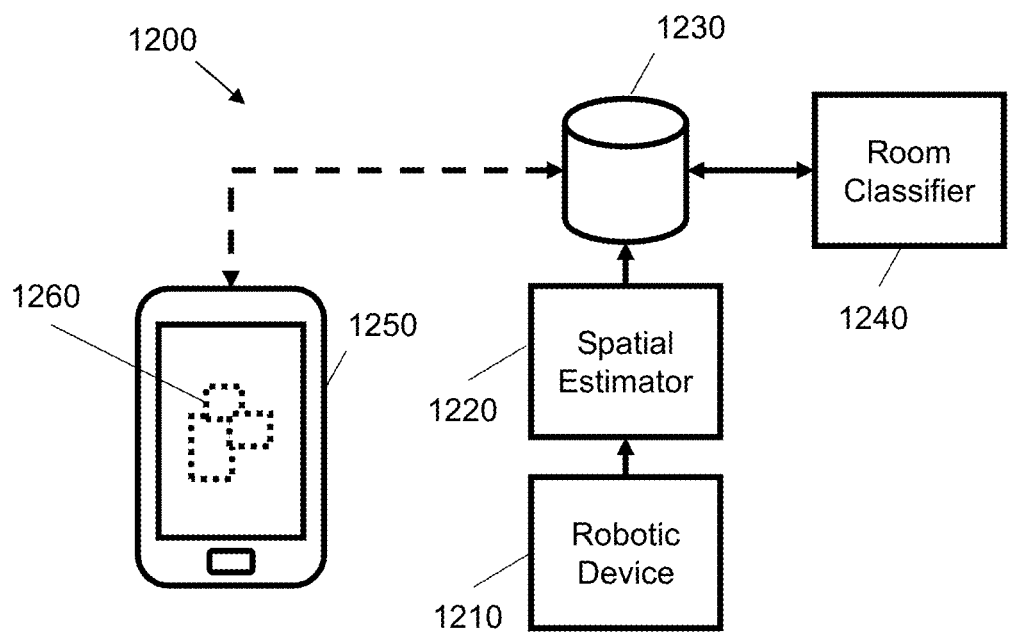
FIG. 12 is a schematic diagram showing certain components of a system for estimating dimensions of an enclosed space, wherein a mobile computing device accesses a room database, according to an example.

FIG. 12 shows an example system 1200 with a number of devices that may use the output of a spatial estimator such as 430, 435 in FIGS. 4A, B or the system 510 in FIG. 5. FIG. 12 shows a robotic device 1210 that is communicatively coupled to a spatial estimator 1220. The spatial estimator is in turn communicatively coupled to a room database 1230. FIG. 12 shows a room classifier 1240 and a mobile computing device 1250 that are arranged to access the room database 1230.

In operation, the robotic device 1210 of FIG. 12 is configured to perform movements such as those shown in FIG. 2A or 2B. In another implementation, the functionality of the robotic device 1210 may be incorporated into the mobile computing device 1250. The robotic device 1210 is configured to obtain image data and communicate this data to a spatial estimator 1220. In FIG. 12, the spatial estimator 1220 is a server computing device. In another case, the spatial estimator 1220 may form part of an embedded controller of the robotic device 1210. The spatial estimator 1220 is configured to output one or more room dimensions based on the image data from the robotic device 1210. The room dimensions may comprise sets of length and width values for rectangular room models. For complex room shapes, for example those formed from a union of rectangles, room dimensions may comprise a set of line definitions that collectively specify an irregular polygon. In FIG. 12, the room database stores the room dimensions from the spatial estimator 1220.

Data from the room database 1230 may be accessed, and/or modified, by room classifier 1240 and mobile computing device 1250. The room classifier 1240 is configured to determine, if a determination is possible, a room class based on the room dimensions stored in the room database 1230. For example, the room classifier 1240 may comprise a machine learning algorithm that is trained on labelled room data, i.e. sets of dimensions with an accompanying room class (e.g. [W=3, L=4, C='lounge']). For example, if robotic device 1210 comprises a domestic robot such as a robotic vacuum cleaner, a first set of users may manually assign a room class to unlabelled room plans 1260 that are displayed on the mobile computing device 1250. Labelled data from the first set of users, suitably anonymized, may then be used to train the room classifier 1240. Then, the room classifier 1240 may be able to predict likely room classes for a second set of users. In one case, the training of the room classifier 1240 may occur on-line, e.g. as room class labels are confirmed or applied by users. In one case, a room classifier 1240 may display a most likely room class label to a user on the mobile computing device 1250, wherein the user is able to confirm that the label does or does not apply. In certain cases, the room class may be stored in the room database 1230 with the room dimensions. The room class may be used by the robotic device 1210 to navigate the room, or activate a particular pre-stored behavior or activity pattern. For example, a domestic cleaning robot may be configured to adjust a cleaning frequency or apply a cleaning accessory based on a room class. Room classification is possible as the described example methods generate a robust set of room dimensions, e.g. the methods operate to give consistent room dimensions for a given room.

As shown in FIG. 12, a mobile computing device 1250 may be configured to access data from the room database 1230 and to use this data to render a room plan 1260 on a display of the device 1250. The room plan may comprise one or more room schematics that are rendered based on the dimensions stored in the room database 1230. In FIG. 12, three boxes of different dimensions are shown on the display, indicating room dimensions for three separate rooms in a house or office. A room plan may comprise a plurality of different floors. A room plan may also display a room class label for each room.

Example Cross-Sections

Figure 13A:
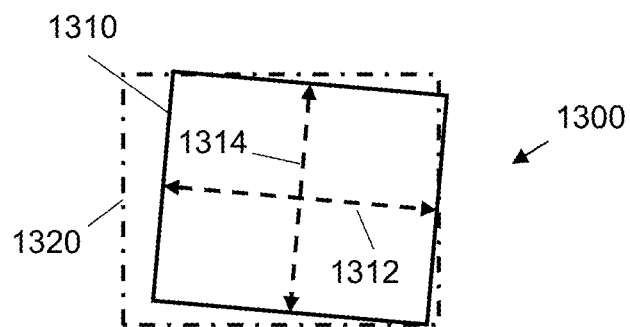
FIGS. 13A to 13C are schematic diagrams showing example polygonal cross-sections that are fitted to various enclosed spaces.
Figure 13B:
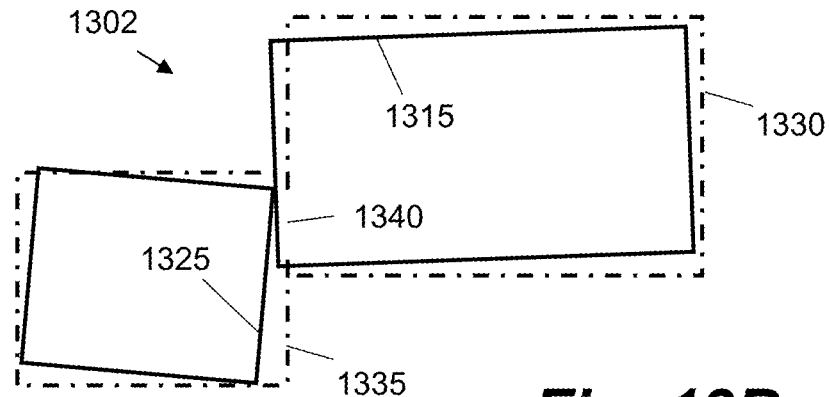
Figure 13C:
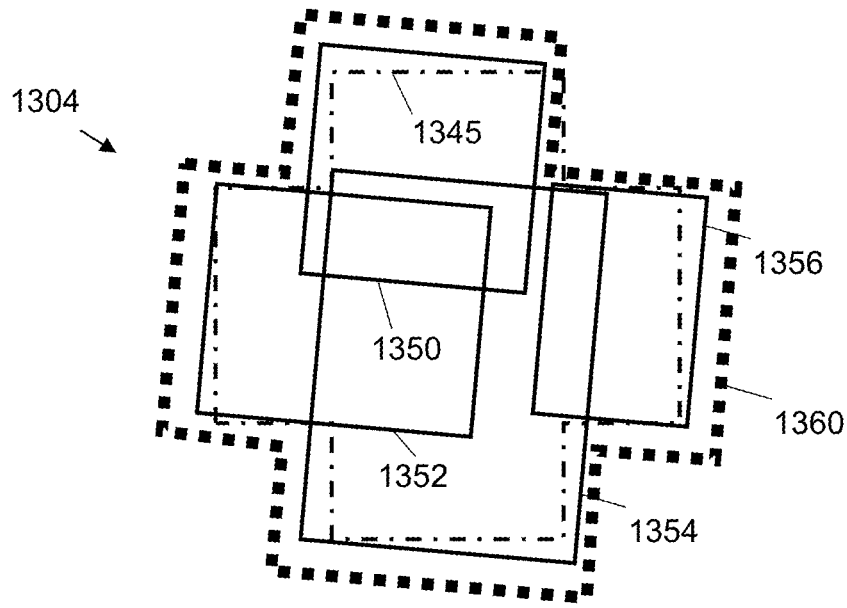

FIGS. 13A to 13C show a number of example cross-sections as determined using the methods and systems described herein. These cross-sections may represent a room or floor plan.

FIG. 13A shows an example 1300 where a rectangular cross section 1310 is fitted to the shape of an enclosed space 1320. The rectangular cross section 1310 has dimensions in the form of a width 1312 and a length 1314. These dimensions may be computed from optimized distances from the reference position of the camera device to the sides of the rectangular cross section 1310 (e.g. as described above with reference to FIG. 3A). The rectangular cross section 1310 in FIG. 13A also has a slight angle of rotation.

FIGS. 13B and 13C show examples 1302, 1304 where the methods described above are repeated for multiple, spaced movements of the monocular multi-directional camera device. These movements may be circular. This then generates multiple sets of dimension estimates. These may be used to determine room demarcation and/or fit a complex shape.

In FIG. 13B, two movements are effected to determine dimensions for two rectangles 1315 and 1325. In this case, the enclosed space comprises two rooms 1330 and 1335, e.g. which are linked by a door or common opening 1340. A robotic device may perform one movement in room 1335 and another movement in room 1330. The method of FIG. 6 may then be repeated twice to determine the dimensions for the two rectangles 1315 and 1325. In this case, an overlap of the rectangles is determined. An overlap metric may be computed based on a percentage of the combined total area of both rectangles that is shared by both rectangles. Alternatively, an overlap metric may be determined based on the highest percentage area of one rectangle that is shared with another rectangle. For example, in FIG. 13B, 0% of the total area is shared. The overlap is then used to determine room demarcation within the enclosed space. In one case, if the overlap is below a predefined threshold (e.g. 5% shared area), the plurality of rectangles are determined to be associated with a respective plurality of rooms within the space, as is shown in FIG. 13B. In this case, the dimensions may be stored in a room database, such as 1230, as separate room records.

FIG. 13C shows a case where an overlap is above a predefined threshold. FIG. 13C shows a cross-shaped room 1345 that has a complex shape (e.g. more than four sides and/or sides at an angle of less than or greater than 90 degree). In this case, a robotic device effects four separate movements to determine dimensions for four separate rectangles 1350, 1352, 1354 and 1356. An overlap in this case may be determined iteratively for pairs of rectangles. For example, rectangles 1350 and 1352 may be compared and determined to have a shared area greater than a predefined threshold (in this case around 40%, which is greater than a 5% threshold). These rectangles may thus be fused to generate a complex shape, e.g. by computing a Boolean union of the area of the rectangles. This combined shape may then be compared with rectangle 1354 and again fused based on the threshold comparison. Finally, a similar comparison may be performed using the resultant complex shape and rectangle 1356; this rectangle may then be joined as the shared area is greater than the threshold. The result of this iteration is a complex shape 1360 (shown spaced apart for clarity) that matches the complex shape of the room 1345. This method of overlap comparison and shape union may enable large scale room mapping of more complex rooms. It may be performed in an incremental manner (e.g. rectangle by rectangle) during active exploration by a robotic device until a complex shape is formed. This complex shape may be provided as an input to the room classifier 1240 for more accurate classification based on room shape.

Certain examples describe herein provide a room size estimation approach that may be implemented by small mobile robots equipped with an omnidirectional camera. The approach provided robust and accurate room dimension estimates for a range of datasets including synthetic depth data and real household and office environments. The methods and systems described herein may be easily implemented in the embedded processors of household robots and need not run at a real-time frame rate. The examples provide improvements to comparative systems that sense free space and obstacles using data from short-range infra-red sensors. These comparative systems are only able to determine an estimate for the dimensions of an enclosed space by laboriously exploring the entire area of the space (e.g. by cleaning and avoiding obstacles). By applying an image processing pipeline to omnidirectional images captured by a robotic device during a short maneuver the present examples enable a global shape of typical rooms to be estimated. Stored room dimensions can then enable intelligent high level behavior from small robot devices without the need for additional sensors or infrastructure. For example, a robotic cleaning device may be aware of the global size, shape, demarcation and identity of the room that it is in, e.g. allowing complex cleaning patterns based on room size or type. The omnidirectional completeness of certain depth maps determined herein enables a low dimensional room model to be fitted to the depth data in a manner that is forgiving of a range of imaging conditions in real-world scenes.

The above examples are to be understood as illustrative. Further examples are envisaged. In one case, the robotic device may comprise a depth sensor in additional to the (RGB) image sensor described in the examples above. The depth sensor may comprise part of the monocular multi-directional camera device. In this case, a sequence of frames may comprise image data and depth data. The depth data may then be used with the image data to estimate depth values, i.e. to determine object distances. For example, depth data may be used as an additional constraint within the volumetric function. The depth sensor may be used to provide a depth image or a point cloud as well as the described monocular images. In one case, the asymmetric function of FIG. 11 may be modified by swapping the cost function coefficients. This effectively flips the chart 1110 horizontally (i.e. about x=0). This modifies the method to determine an innermost rather than outermost cross-section fit. This may be considered to be a free-space estimate. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. An image processing method for estimating dimensions of an enclosed space comprising:
    obtaining image data from a monocular multi-directional camera device located within the enclosed space, the monocular multi-directional camera device being arranged to capture image data from a plurality of angular positions, the image data comprising a sequence of images having disparity within a plane of movement of the camera device;
    determining pose data corresponding to the image data, the pose data indicating the location and orientation of the monocular multi-directional camera device, the pose data being determined using a set of features detected within the image data;
    estimating depth values by evaluating a volumetric function of the image data and the pose data, each depth value representing a distance from a reference position of the monocular multi-directional camera device to a surface in the enclosed space;
    defining a three-dimensional volume around the reference position of the monocular multi-directional camera device, the three-dimensional volume having a two-dimensional polygonal cross-section within the plane of movement of the camera device; and
    fitting the three-dimensional volume to the depth values to determine dimensions for the polygonal cross-section, wherein the determined dimensions provide an estimate for the dimensions of the enclosed space.

2. The method of claim 1, wherein fitting the three-dimensional volume to the depth values comprises:
    optimizing, with regard to the dimensions for the polygonal cross-section, a function of an error between:
        a first set of depth values from the evaluation of the volumetric function of the image data and the pose data, and
        a second set of depth values estimated from the reference position to the walls of the three-dimensional volume.

3. The method of claim 2, comprising:
    using ray tracing to determine the second set of depth values.

4. The method of claim 2, wherein the function of the error is evaluated by comparing a depth image with pixel values defining the first set of depth values with a depth image with pixel values defining second set of depth values.

5. The method of claim 2, wherein the function comprises an asymmetric function.

6. The method of claim 5, wherein the asymmetric function returns higher values when the first set of depth values are greater than the second set of depth values as compared to when the first set of depth values are less than the second set of depth values.

7. The method of claim 2, comprising:
    applying automatic differentiation with forward accumulation to compute Jacobians, wherein said Jacobians are used to optimise the function of the error between the first and second sets of depth values.

8. The method of claim 1, wherein the polygonal cross-section comprises a rectangle and said dimensions comprise distances from the reference position to respective sides of the rectangle.

9. The method of claim 8, wherein fitting the three-dimensional volume comprises determining an angle of rotation of the rectangle with respect to the reference position.

10. The method of claim 9, wherein the three-dimensional volume is fitted using a coordinate descent approach that evaluates the distances from the reference position to respective sides of the rectangle before the angle of rotation of the rectangle with respect to the reference position.

11. The method of claim 8, wherein:
    the method is repeated for multiple spaced movements of the monocular multi-directional camera device to determine dimensions for a plurality of rectangles, the rectangles representing an extent of the enclosed space.

12. The method of claim 11, comprising:
    determining an overlap of the rectangles; and
    using the overlap to determine room demarcation within the enclosed space,
    wherein, if the overlap is below a predefined threshold, the plurality of rectangles are determined to be associated with a respective plurality of rooms within the space, and
    wherein, if the overlap is above a predefined threshold, the plurality of rectangles are determined to be associated with a complex shape of the enclosed space.

13. The method of claim 11, comprising:

computing a Boolean union of the plurality of rectangles to provide an estimate for a shape of the enclosed space.

14. The method of claim 1, comprising:
inputting the dimensions for the polygonal cross-section into a room classifier; and
determining a room class using the room classifier.

15. The method of claim 14, comprising:
determining an activity pattern for a robotic device based on the room class.

16. A system for estimating dimensions of an enclosed space comprising:
a monocular multi-directional camera device to capture a sequence of images from a plurality of angular positions within the enclosed space;
a pose estimator to determine pose data from the sequence of images, the pose data indicating the location and orientation of the monocular multi-directional camera device at a plurality of positions during the instructed movement, the pose data being determined using a set of features detected within the sequence of images;
a depth estimator to estimate depth values by evaluating a volumetric function of the sequence of images and the pose data, each depth value representing a distance from a reference position of the multi-directional camera device to a surface in the enclosed space; and
a dimension estimator to:
fit a three-dimensional volume to the depth values from the depth estimator by optimising dimensions of a two-dimensional polygonal cross-section of the three-dimensional volume, and
output an estimate for the dimensions of the enclosed space based on the optimised dimensions of the two-dimensional polygonal cross-section.

17. The system of claim 16, wherein at least one of the monocular multi-directional camera device, the depth estimator, the pose estimator and the dimension estimator are embedded within a robotic device.

18. The system of claim 17, comprising:
a room database comprising estimates from the dimension estimator for a plurality of enclosed spaces within a building.

19. The system of claim 18, wherein data from the room database is accessible from a mobile computing device over a network.

20. A non-transitory computer-readable storage medium comprising computer-executable instructions which, when executed by a processor, cause a computing device to map a space, wherein the instructions cause the computing device to:
receive a sequence of frames from a monocular multi-directional camera, the multi-directional camera being arranged to capture image data for each of the frames from a plurality of angular positions, the sequence of frames being captured at different angular positions within a plane of movement for the space;
determine location and orientation estimates for the camera for each frame by matching detected features across the sequence of frames;
bundle adjust the location and orientation estimates for the camera and the detected features across the sequence of frames to generate an optimised set of location and orientation estimates for the camera;
determine a reference frame from the sequence of frames, the reference frame having an associated reference location and orientation;
evaluate a photometric error function between pixel values for the reference frame and projected pixel values from a set of comparison images that overlap the reference frame, said projected pixel values being a function of a surface distance from the camera and the optimised set of location and orientation estimates for the camera;
determine a first set of surface distances for different angular positions corresponding to different pixel columns of the reference frame based on the evaluated photometric error function;
determine parameters for a planar rectangular cross-section of a three-dimensional volume enclosing the reference location by optimising an error between the first set of surface distances and a second set of surface distances determined based on the three-dimensional volume; and
determine a floor plan for the space using the determined parameters for the planar rectangular cross-section.

21. The medium of claim 20,
wherein the instructions are repeated to determine parameters for a plurality of planar rectangular cross-sections, and
wherein the instructions to determine a floor plan comprise instructions to determine a floor plan based on a union of the plurality of planar rectangular cross-sections.

22. The medium of claim 20,
wherein the instructions are repeated to determine parameters for a plurality of planar rectangular cross-sections, and
wherein the instructions comprise instructions to:
determine a spatial overlap of the plurality of planar rectangular cross-sections; and
determine room demarcation for the space based on the spatial overlap.

* * * * *